US012620121B2

(12) United States Patent
Hayashi et al.

(10) Patent No.: US 12,620,121 B2
(45) Date of Patent: May 5, 2026

(54) METHOD OF RECOGNIZING POSITION AND ATTITUDE OF OBJECT, AND NON-TRANSITORY COMPUTER-READABLE STORAGE MEDIUM

(71) Applicant: SEIKO EPSON CORPORATION, Tokyo (JP)

(72) Inventors: Masaki Hayashi, Matsumoto (JP); Hirokazu Kasahara, Okaya (JP); Guoyi Fu, Richmond Hill (CA); Zhongzhen Luo, Vaughan (CA)

(73) Assignee: SEIKO EPSON CORPORATION (JP)

( * ) Notice: Subject to any disclaimer, the term of this patent is extended or adjusted under 35 U.S.C. 154(b) by 288 days.

(21) Appl. No.: 18/456,761

(22) Filed: Aug. 28, 2023

(65) Prior Publication Data

US 2024/0070896 A1 Feb. 29, 2024

(30) Foreign Application Priority Data

Aug. 29, 2022 (JP) ................................ 2022-135489

(51) Int. Cl.
*G06T 7/70* (2017.01)
*G06V 10/771* (2022.01)

(52) U.S. Cl.
CPC .............. *G06T 7/70* (2017.01); *G06V 10/771* (2022.01); *G06V 2201/07* (2022.01)

(58) Field of Classification Search
CPC ........ G06T 7/70; G06V 10/771; G06V 10/44; G06V 20/64
See application file for complete search history.

(56) References Cited

U.S. PATENT DOCUMENTS

2021/0390731 A1* 12/2021 Wang .................... G06V 10/764
2022/0277472 A1* 9/2022 Birchfield ................ G06N 3/08
2025/0095192 A1* 3/2025 Pan ........................ G06V 40/10

FOREIGN PATENT DOCUMENTS

WO WO-2022001106 A1 * 1/2022 ............. G06F 18/23

OTHER PUBLICATIONS

Dou, J., Qin, Q., & Tu, Z. (2021). Multi-modal image registration based on local self-similarity and bidirectional matching. Pattern Recognition and Image Analysis, 31(1), 7-17. (Year: 2021).*

(Continued)

*Primary Examiner* — Stephen R Koziol
*Assistant Examiner* — Ashley Hytrek
(74) *Attorney, Agent, or Firm* — Harness, Dickey & Pierce, P.L.C.

(57) ABSTRACT

A method of the present disclosure includes (a) generating an input image by imaging a scene containing the M objects by a camera, (b) obtaining a feature map showing feature amounts relating to the N keypoints from the input image using a learned machine learning model with the input image as input and the feature map as output, (c) obtaining three-dimensional coordinates of the N keypoints belonging to each of the M objects using the feature map, and (d) determining positions and attitudes of one or more objects of the M objects using the three-dimensional coordinates of the N keypoints belonging to each of the M objects, wherein (c) includes (c1) obtaining M×N keypoints having undetermined correspondence relationships with the M objects and determining the three-dimensional coordinates of the M×N keypoints, and (c2) grouping the M×N keypoints to the N keypoints belonging to each of the M objects.

2 Claims, 23 Drawing Sheets

(56)         References Cited

OTHER PUBLICATIONS

Z. Cao, G. Hidalgo, T. Simon, S.-E. Wei and Y. Sheikh, "OpenPose: Realtime Multi-Person 2D Pose Estimation Using Part Affinity Fields," in IEEE Transactions on Pattern Analysis and Machine Intelligence, vol. 43, No. 1, pp. 172-186, Jan. 1, 2021, doi: 10.1109/ TPAMI.2019.2929257. (Year: 2021).*

X. Zhang, X. Zhang, F. Ji and Q. Yu, "Known Landing Area Rough Locating from Far Distance Based on DDM-SIFT," 2008 Congress on Image and Signal Processing, Sanya, China, 2008, pp. 686-690, doi: 10.1109/CISP.2008.473. (Year: 2008).*

N. Bold, C. Zhang and T. Akashi, "3D Point Cloud Retrieval With Bidirectional Feature Match," in IEEE Access, vol. 7, pp. 164194-164202, 2019, doi: 10.1109/ACCESS.2019.2952157 (Year: 2019).*

W. Gao and R. Tedrake, "kPAM-SC: Generalizable Manipulation Planning using KeyPoint Affordance and Shape Completion," 2021 IEEE International Conference on Robotics and Automation (ICRA), Xi'an, China, 2021, pp. 6527-6533, doi: 10.1109/ICRA48506.2021. 9561428. (Year: 2021).*

W. Gao and R. Tedrake, "kPAM 2.0: Feedback Control for Category-Level Robotic Manipulation," in IEEE Robotics and Automation Letters, vol. 6, No. 2, pp. 2962-2969, Apr. 2021, doi: 10.1109/LRA. 2021.3062315. (Year: 2021).*

Z. Cao, G. Hidalgo, T. Simon, S.-E. Wei and Y. Sheikh, "OpenPose: Realtime Multi-Person 2D Pose Estimation Using Part Affinity Fields," in IEEE Transactions on Pattern Analysis and Machine Intelligence, vol. 43, No. 1, pp. 172-186, Jan. 1, 2021, doi: 10.1109/ TPAMI.2019.2929257. (Year: 2021) (Year: 2021).*

Manuelli, L., Gao, W., Florence, P., Tedrake, R. (2022). KPAM: KeyPoint Affordances for Category-Level Robotic Manipulation. ISRR 2019. Springer Proceedings in Advanced Robotics, vol. 20. Springer, Cham. https://doi.org/10.1007/978-3-030-95459-8_9 (Year: 2022).*

Z. Luo, W. Xue, J. Chae and G. Fu, "SKP: Semantic 3D Keypoint Detection for Category-Level Robotic Manipulation," in IEEE Robotics and Automation Letters, vol. 7, No. 2, pp. 5437-5444, Apr. 2022, doi: 10.1109/LRA.2022.3157438. (Year: 2022).*

Lauer, J., Zhou, M., Ye, S. et al. Multi-animal pose estimation, identification and tracking with DeepLabCut. Nat Methods 19, 496-504 (2022). https://doi.org/10.1038/s41592-022-01443-0 (Year: 2022).*

Gao, Wei and Russ Tedrake: "kPAM 2.0: Feedback Control for Category-Level Robotic Manipulation"; IEEE Robotics and Automation Letters; arXiv:2102.06279v1 [cs.RO]; Feb. 11, 2021; (8pp).

Xu, Ruinian; Fu-Jen Chu; Chao Tang et al.: "An Affordance Keypoint Detection Network for Robot Manipulation"; IEEE Robotics and Automation Letters; vol. 6; Issue: 2; Apr. 2021; (8pp).

Manuelli, Lucas; Wei Gao; Peter Florence et al.: "kPAM: KeyPoint Affordances for Category-Level Robotic Manipulation"; arXiv:1903. 06684v2 [cs.RO]; Oct. 29, 2019; (26pp).

Gao, Wei and Russ Tedrake: "kPAM-SC: Generalizable Manipulation Planning using KeyPoint Affordance and Shape Completion"; arXiv: 1909.06980v1 [cs.RO]; Sep. 16, 2019; (7pp).

Luo, Zhongzhen; Wenjie Xue; Julia Chae et al. "SKP: Semantic 3D Keypoint Detection for Category-Level Robotic Manipulation"; IEEE Robotics and Automation Letters; vol. 7; No. 2; Apr. 2022; pp. 5437-5444; (8pp).

* cited by examiner

Learning Object Models

FIG. 6
Simulation Images
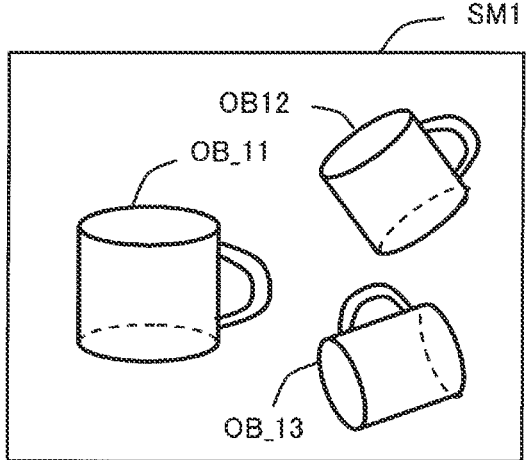
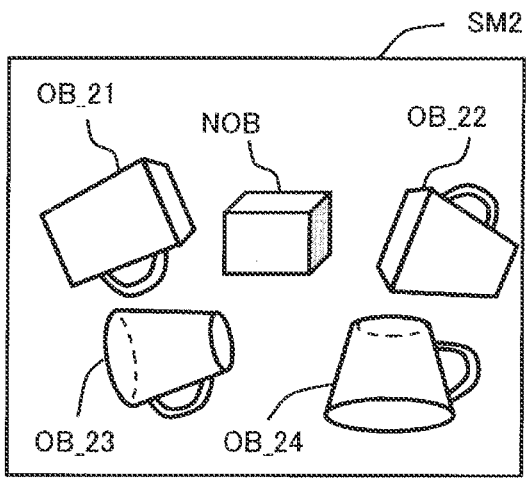

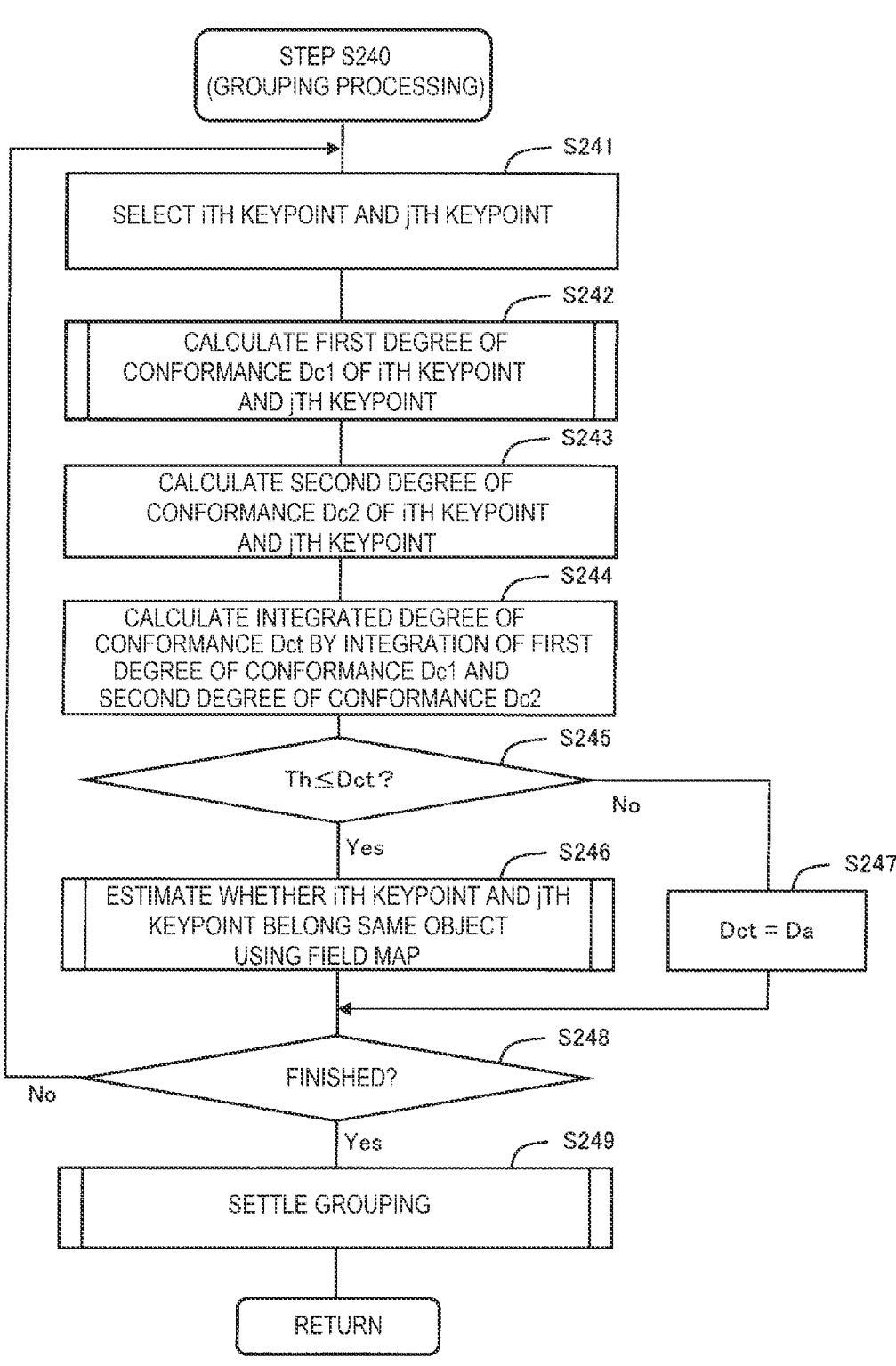

STEP S240
(GROUPING PROCESSING)

S241
SELECT iTH KEYPOINT AND jTH KEYPOINT

S242
CALCULATE FIRST DEGREE OF
CONFORMANCE Dc1 OF iTH KEYPOINT
AND jTH KEYPOINT

S243
CALCULATE SECOND DEGREE OF
CONFORMANCE Dc2 OF iTH KEYPOINT
AND jTH KEYPOINT

S244
CALCULATE INTEGRATED DEGREE OF
CONFORMANCE Dct BY INTEGRATION OF FIRST
DEGREE OF CONFORMANCE Dc1 AND
SECOND DEGREE OF CONFORMANCE Dc2

S245
Th≤Dct?

No

S247
Dct = Da

Yes     S246
ESTIMATE WHETHER iTH KEYPOINT AND jTH
KEYPOINT BELONG SAME OBJECT
USING FIELD MAP

S248
FINISHED?

No

Yes     S249
SETTLE GROUPING

RETURN

*FIG. 17*

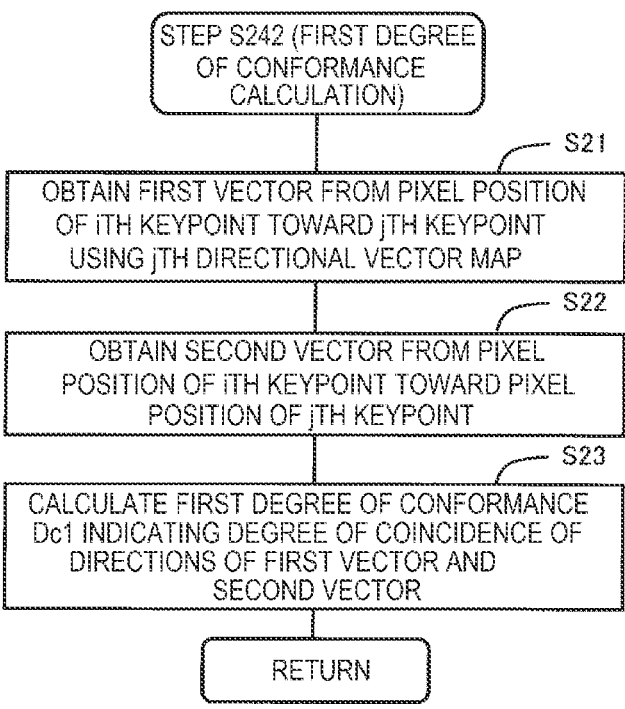

STEP S242 (FIRST DEGREE
OF CONFORMANCE
CALCULATION)

S21

OBTAIN FIRST VECTOR FROM PIXEL POSITION
OF iTH KEYPOINT TOWARD jTH KEYPOINT
USING jTH DIRECTIONAL VECTOR MAP

S22

OBTAIN SECOND VECTOR FROM PIXEL
POSITION OF iTH KEYPOINT TOWARD PIXEL
POSITION OF jTH KEYPOINT

S23

CALCULATE FIRST DEGREE OF CONFORMANCE
Dc1 INDICATING DEGREE OF COINCIDENCE OF
DIRECTIONS OF FIRST VECTOR AND
SECOND VECTOR

RETURN

*FIG. 18*
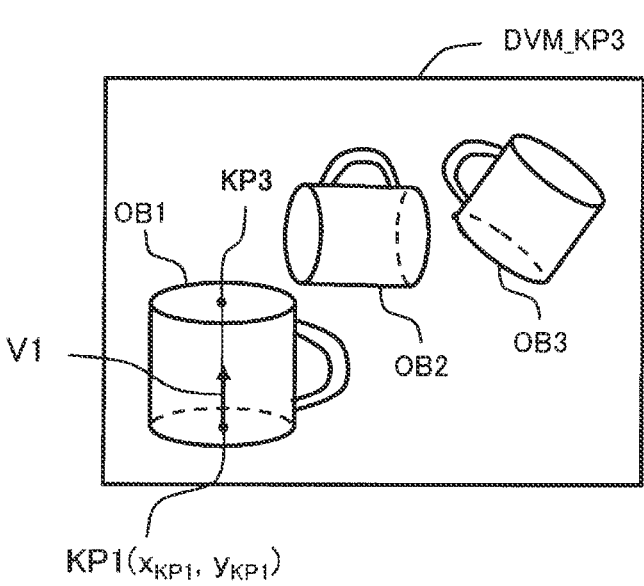
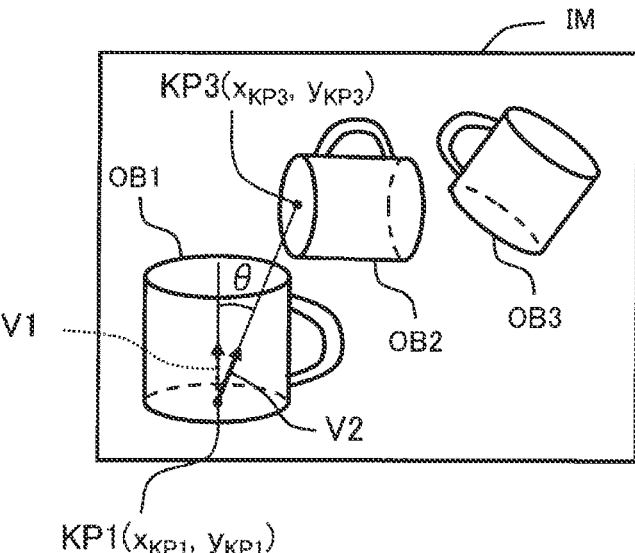

FIG. 19
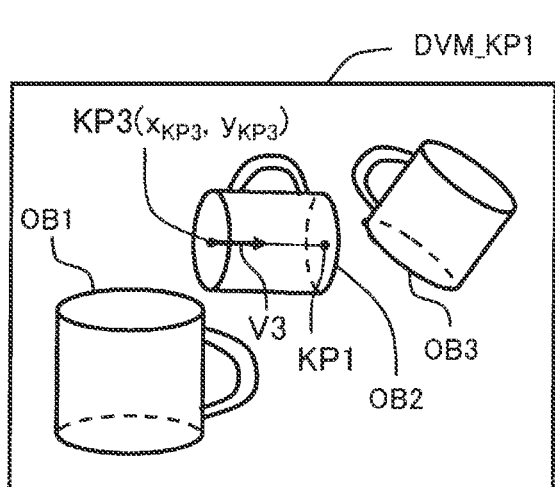
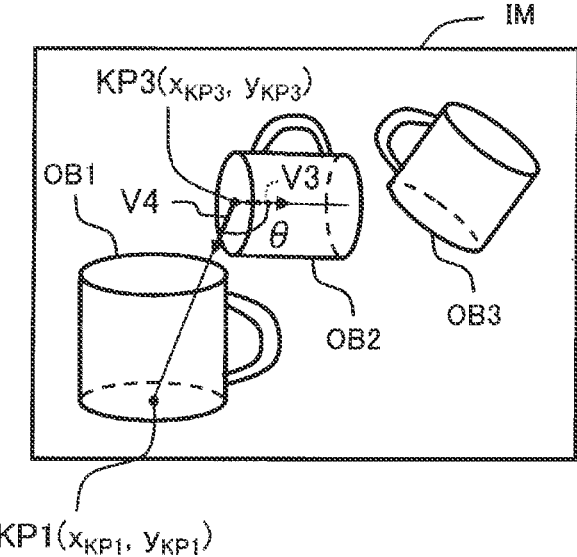

METHOD OF RECOGNIZING POSITION AND ATTITUDE OF OBJECT, AND NON-TRANSITORY COMPUTER-READABLE STORAGE MEDIUM

The present application is based on, and claims priority from JP Application Serial Number 2022-135489, filed Aug. 29, 2022, the disclosure of which is hereby incorporated by reference herein in its entirety.

BACKGROUND

1. Technical Field

The present disclosure relates to a method of recognizing a position and an attitude of an object, and a non-transitory computer-readable storage medium.

2. Related Art

Feedback Control for Category-Level Robotic Manipulation (IEEE Robotics and Automation Letter, arXiv: 2102.06279v1) and An Affordance Keypoint Detection Network for Robot Manipulation (IEEE Robotics and Automation Letters, Volume: 6, Issue: 2, April 2021) disclose techniques of recognizing a position and an attitude of an object by estimating a plurality of characteristic keypoints preset for the object in a neural network from an image of the object.

In the techniques disclosed in Feedback Control for Category-Level Robotic Manipulation and An Affordance Keypoint Detection Network for Robot Manipulation, the position and the attitude of the object may be robustly recognized to some degree for changes in image. However, in learning of the neural network, in order to robustly recognize the object even when conditions including the shape and the surrounding environment of the object vary, it is necessary to prepare vast amounts of learning data corresponding to combinations of those various conditions. Further, manual attachments of correct labels vary from person to person, and there is a problem that errors are introduced into the correct labels and degradation in recognition accuracy is caused. Furthermore, a single object is assumed in related art, and there is a problem that it is impossible to recognize positions and attitudes of a plurality of objects. Accordingly, it is desired to solve at least part of these problems.

SUMMARY

According to a first aspect of the present disclosure, a method of learning a machine learning model used for recognition of a position and an attitude of an object imaged by a camera using a plurality of keypoints set for the object is provided. The method includes (a) generating a plurality of learning object models in which at least part of a shape and a surface property of the object is changed using basic shape data of the object, (b) generating a plurality of scenes in which part or all of the plurality of learning object models are placed in an environment in which the object is to be placed by simulations and generating a plurality of simulation images which are to be obtained by imaging of the respective plurality of scenes by the camera, (c) generating a correct feature map showing correct values of feature amounts relating to the plurality of keypoints to correspond to each of the plurality of simulation images, and (d) learning the machine learning model for estimation of a feature map from an input image captured by the camera using the plurality of simulation images and a plurality of the correct feature maps as teacher data.

According to a second aspect of the present disclosure, a non-transitory computer-readable storage medium storing a computer program for controlling a processor to execute processing of learning a machine learning model used for recognition of a position and an attitude of an object imaged by a camera using a plurality of keypoints set for the object is provided. The computer program is for controlling the processor to execute (a) processing of generating a plurality of learning object models in which at least part of a shape and a surface property of the object is changed using basic shape data of the object, (b) processing of generating a plurality of scenes in which part or all of the plurality of learning object models are placed in an environment in which the object is to be placed by simulations and generating a plurality of simulation images which are to be obtained by imaging of the respective plurality of scenes by the camera, (c) processing of generating a correct feature map showing correct values of feature amounts relating to the plurality of keypoints to correspond to each of the plurality of simulation images, and (d) processing of learning the machine learning model for estimation of a feature map from an input image captured by the camera using the plurality of simulation images and a plurality of the correct feature maps as teacher data.

According to a third aspect of the present disclosure, a method of recognizing a position and an attitude of an object using first to Nth N keypoints set for the object, M being an integer of 1 or more and N being an integer of 2 or more, is provided. The method includes (a) generating an input image by imaging a scene containing the M objects by a camera, (b) obtaining a feature map showing feature amounts relating to the N keypoints from the input image using a learned machine learning model with the input image as input and the feature map as output, (c) obtaining three-dimensional coordinates of the N keypoints belonging to each of the M objects using the feature map, and (d) determining positions and attitudes of one or more objects of the M objects using the three-dimensional coordinates of the N keypoints belonging to each of the M objects. (c) includes (c1) obtaining M×N keypoints having undetermined correspondence relationships with the M objects and determining the three-dimensional coordinates of the M×N keypoints, and (c2) grouping the M×N keypoints to the N keypoints belonging to each of the M objects.

According to a fourth aspect of the present disclosure, a non-transitory computer-readable storage medium storing a computer program for controlling a processor to execute processing of recognizing a position and an attitude of an object using first to Nth N keypoints set for the object, M being an integer of 1 or more and N being an integer of 2 or more, is provided. The computer program is for controlling the processor to execute (a) processing of generating an input image by imaging a scene containing the M objects by a camera, (b) processing of obtaining a feature map showing feature amounts relating to the N keypoints from the input image using a learned machine learning model with the input image as input and the feature map as output, (c) processing of obtaining three-dimensional coordinates of the N keypoints belonging to each of the M objects using the feature map, and (d) processing of determining positions and attitudes of one or more objects of the M objects using the three-dimensional coordinates of the N keypoints belonging to each of the M objects. The processing (c) includes (c1) processing of obtaining M×N keypoints having undetermined correspondence relationships with the M objects and determining the three-dimensional coordinates of the M×N keypoints, and (c2) processing of grouping the M×N keypoints to the N keypoints belonging to each of the M objects.

BRIEF DESCRIPTION OF THE DRAWINGS

FIG. 6 is an explanatory diagram showing a plurality of simulation images.

FIG. 10 is an explanatory diagram showing a noiseless distance map as a fourth type of feature map.

FIG. 16 is a flowchart showing a detailed procedure of grouping processing.

FIG. 17 is a flowchart showing a detailed procedure of first degree of conformance calculation processing.

FIG. 18 is an explanatory diagram showing details of the first degree of conformance calculation processing.

FIG. 19 is an explanatory diagram showing details of second degree of conformance calculation processing.

DESCRIPTION OF EMBODIMENTS

Figure 1:
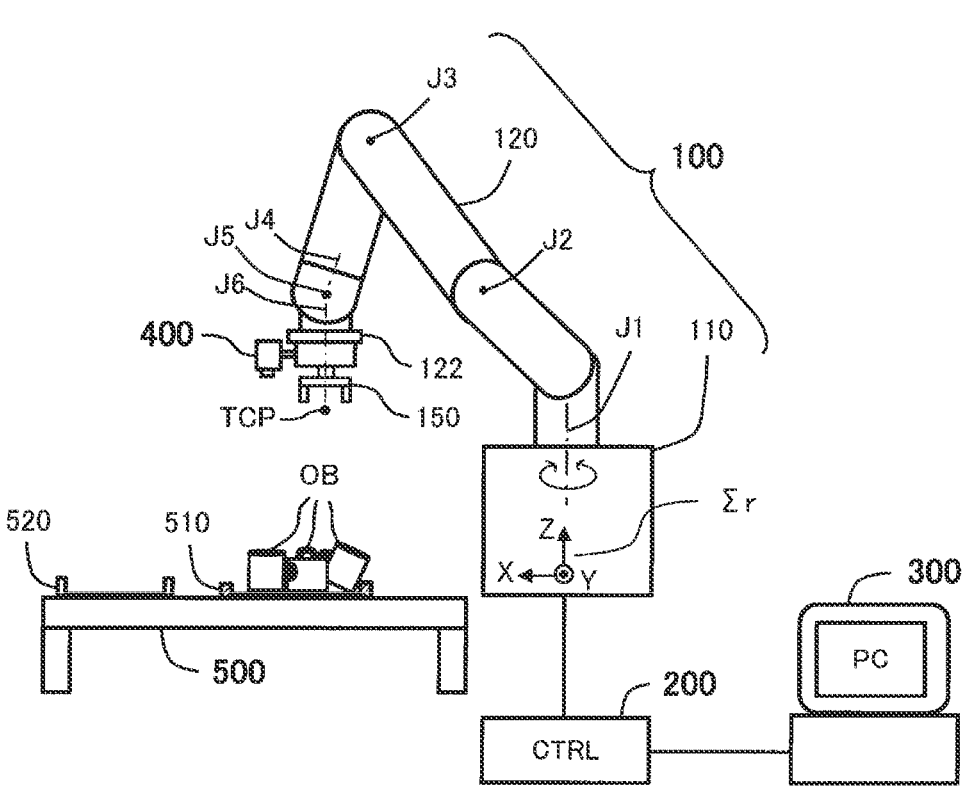
FIG. 1 is an explanatory diagram showing a configuration of a robot system.

FIG. 1 is an explanatory diagram showing an example of a robot system in one embodiment. The robot system includes a robot 100, a control apparatus 200 controlling the robot 100, an information processing apparatus 300, a camera 400, and a platform 500. The information processing apparatus 300 is e.g., a personal computer. In FIG. 1, three axes X, Y, Z defining an orthogonal coordinate system in a three-dimensional space are drawn. The X-axis and the Y-axis are horizontal axes and the Z-axis is a vertical axis. These X-axis, Y-axis, and Z-axis are coordinate axes of a robot coordinate system Zr with the origin set in a predetermined position of the robot 100.

The robot 100 includes a base 110 and a robot arm 120. A hand 150 as an end effector is attached to an arm end 122 as a distal end portion of the robot arm 120. The hand 150 can be realized as a gripper or a suction pad that can grip an object OB. A TCP (Tool Center Point) as a control point of the robot 100 is set in a distal end portion of the hand 150. Note that the control point TCP can be set in an arbitrary position.

The robot arm 120 is sequentially coupled by six joints J1 to J6. Of these joints J1 to J6, the three joints J2, J3, J5 are bending joints and the other three joints J1, J4, J6 are twisting joints. In the embodiment, a six-axis robot is exemplified, however, a robot having any robot arm mechanism having one or more joints can be used. Further, the robot 100 of the embodiment is a vertical articulated robot, but a horizontal articulated robot may be used.

On the platform 500, a first tray 510 and a second tray 520 are placed. In the first tray 510, a plurality of objects OB are placed in bulk. The second tray 520 is used as a location on which the objects OB picked out from the first tray 510 are mounted. The robot 100 executes work to pick out the objects OB from the first tray 510 and mount the objects on the second tray 520.

The camera 400 capturing images of the objects OB within the first tray 510 is placed in the distal end portion of the robot arm 120. The image captured by the camera 400 is used for obtainment of three-dimensional positions and attitudes of the objects OB. Hereinafter, the three-dimensional position and attitude are referred to as "position and attitude". As the camera 400, e.g., an RGBD camera or a stereo camera may be used. The RGBD camera is a camera having an RGB camera capturing a color image and a D camera capturing a depth image or a distance image. In the present disclosure, the depth and the distance are used as synonyms. Note that the camera 400 is not necessarily placed in the robot arm 120, but may be separately placed from the robot 100.

Figure 2:
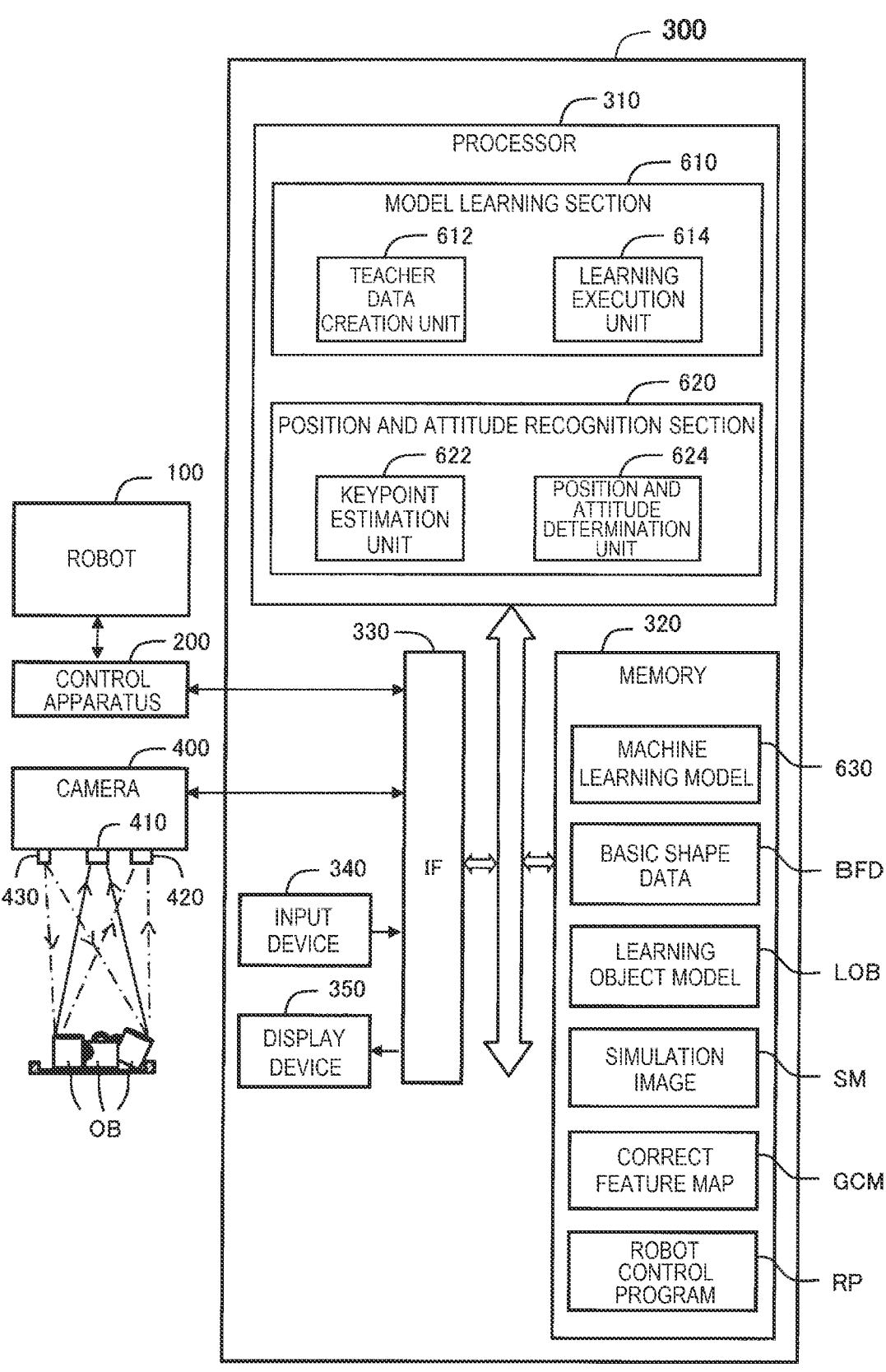
FIG. 2 is a functional block diagram of an information processing apparatus.

FIG. 2 is a block diagram showing functions of the information processing apparatus 300. The information processing apparatus 300 includes a processor 310, a memory 320, an interface circuit 330, and an input device 340 and a display device 350 coupled to the interface circuit 330. Also, the control apparatus 200 and the camera 400 are coupled to the interface circuit 330.

In the embodiment, the camera 400 has a first camera 410 capturing a color image, a second camera 420 capturing a distance image, and an illumination unit 430 radiating illumination light for the second camera 420. The illumination unit 430 is a projector radiating an infrared pattern for capturing the distance image.

The processor 310 has functions as a model learning section 610 and a position and attitude recognition section 620. The model learning section 610 includes a teacher data creation unit 612 and a learning execution unit 614. The teacher data creation unit 612 creates teacher data used for learning of a machine learning model 630 used for recognition of a position and an attitude of the object OB. The learning execution unit 614 executes learning of the machine learning model 630 using the teacher data created in the teacher data creation unit 612. The position and attitude recognition section 620 includes a keypoint estimation unit 622 and a position and attitude determination unit 624. The keypoint estimation unit 622 estimates a plurality of keypoints preset for the object OB using the learned machine learning model 630. The position and attitude determination unit 624 determines the position and the attitude of the object OB using the plurality of estimated keypoints. The functions of the model learning section 610 and the position and attitude recognition section 620 are respectively realized by the processor 310 executing a computer program stored in the memory 320. Note that part or all of the functions of the model learning section 610 and the position and attitude recognition section 620 may be realized by a hardware circuit.

In the memory 320, the machine learning model 630, basic shape data BFD representing a basic shape of the object OB, a plurality of learning object models LOB, a plurality of simulation images SM, a plurality of correct feature maps GCM, and a robot control program RP are stored. The robot control program RP includes a plurality of commands for operating the robot 100. Contents of other data than the robot control program RP will be described later.

Figure 3:
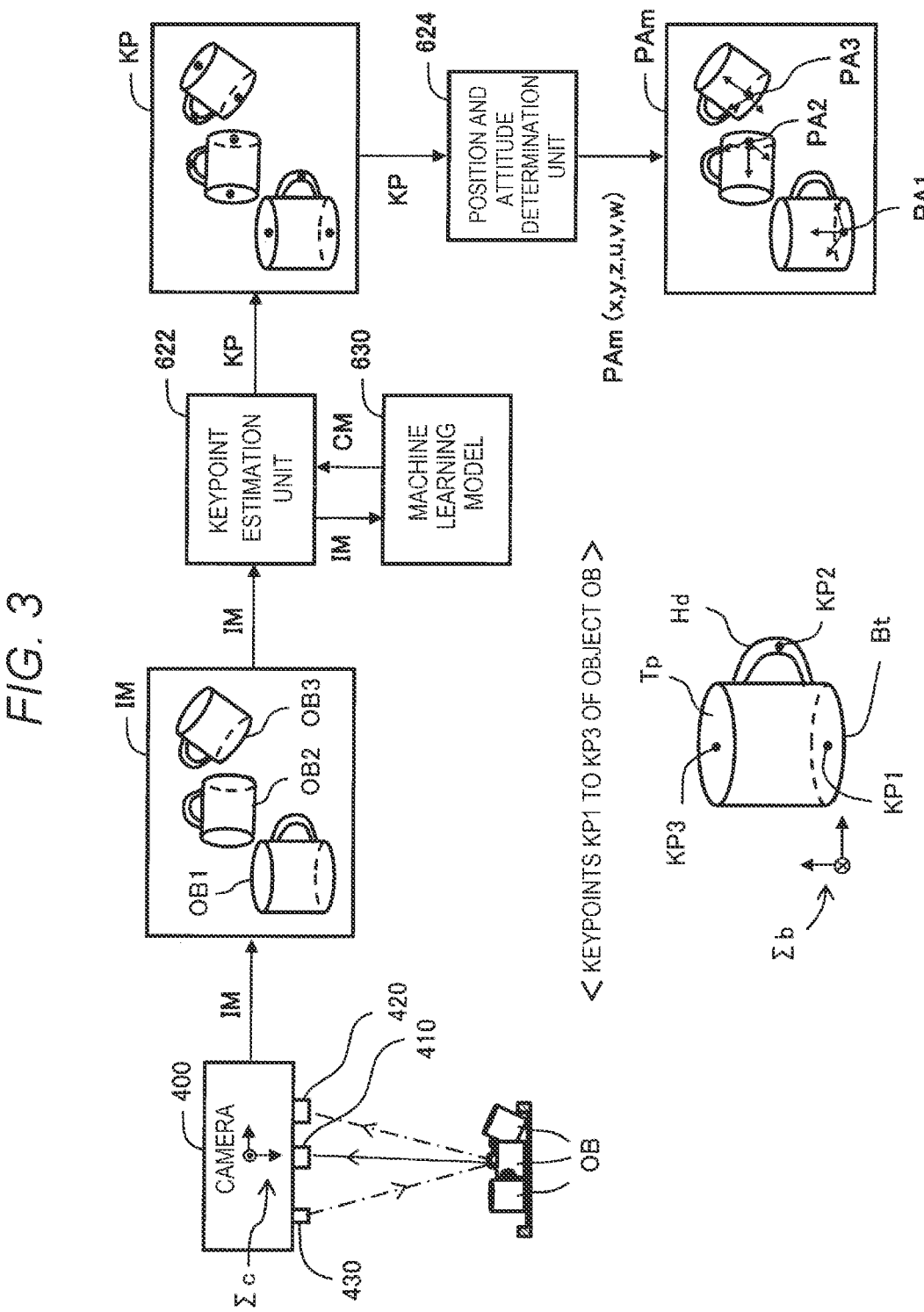
FIG. 3 is an explanatory diagram showing a recognition function of positions and attitudes of objects by a position and attitude recognition section.

FIG. 3 is an explanatory diagram showing a recognition function of the position and the attitude of the objects OB by the position and attitude recognition section 620. The camera 400 is calibrated in advance and a correlation between a camera coordinate system Σc and the robot coordinate system Zr shown in FIG. 1 is known. The camera 400 creates an input image IM by imaging a scene containing one or more objects OB. In the example of FIG. 3, the input image IM contains three objects OB1 to OB3. These objects OB1 to OB3 may be objects of the same model having the same shape and surface property or may include a plurality of types of objects different in at least part of the shape and surface property. In the embodiment, the input image IM contains a two-dimensional color image and a distance image. The distance image is created using the phase-shift method, the spatial coding method, the stereo-block matching method, or the like. The keypoint estimation unit 622 estimates N keypoints KP in the respective M objects OBm contained in the input image IM using the learned machine learning model 630. Here, M is an integer equal to or larger than 1 and N is an integer equal to or larger than 2. Note that M is preferably an integer equal to or larger than 2. Further, N is preferably an integer equal to or larger than 3.

In the lower left part of FIG. 3, three keypoints KP1 to KP3 set for one object OB are exemplified. In this example, the object OB is a mug. The first keypoint KP1 is set on a bottom surface Bt of the object OB. The second keypoint KP2 is set for a handle Hd of the object OB. The third keypoint KP3 is set for a top opening Tp of the object OB. Each keypoint KP shows a representative position representing a specific portion of the object OB, and the position of the keypoint KP is expressed by three-dimensional coordinates (x,y,z). For example, the first keypoint KP1 is expressed by three-dimensional coordinates of the center position of the bottom surface Bt of the object OB. The same applies to the other keypoints KP2, KP3. When the keypoint KP is set, the three-dimensional coordinates expressing the keypoint KP are represented by an object coordinate system Zb with the coordinate origin at a reference point of the object OB. In FIG. 3, for convenience of explanation, the origin position of the object coordinate system Zb is drawn in a location slightly apart from the object OB, however, the origin of the object coordinate system Zb can be set in an arbitrary position including the center of the bottom surface Bt. Note that the keypoint KP is a meaningful point set in the representative position of the specific portion of the object OB and can also be referred to as "semantic keypoint".

When the object OB is not rotationally symmetric, it is preferable to set the number N of keypoints KP set for one object OB to 3 or more. Accordingly, a three-dimensional position and rotation angles around the three axes of the object OB can be settled from three-dimensional positions of the N keypoints KP in the three-dimensional coordinate system including the camera coordinate system Σc and the robot coordinate system Zr.

In FIG. 3, there are cases where additional signs "1" to "3" for distinction of one from another are attached to the ends of the basic signs "KP" indicating the keypoints and these additional signs are omitted. As shown in the example, in the drawings and the specification of the present disclosure, the additional signs for distinction of one from another may be omitted. This applies to the other terms and signs of objects than the keypoints KP.

The machine learning model 630 is configured to output a feature map CM showing feature amounts relating to the plurality of keypoints KP with the input image IM as input. Examples of the feature map CM will be described later. As the machine learning model 630, various neural networks e.g., VAE (Variational Autoencoder) or U-Net can be used.

The keypoint estimation unit 622 estimates the three-dimensional coordinates of the N keypoints KP with respect to each of the M objects OB using the feature map CM obtained in the machine learning model 630. Here, the three-dimensional coordinates of the keypoints KP are expressed by e.g., the camera coordinate system Σc. The position and attitude determination unit 624 determines positions and attitudes PAm of one or more objects OBm using the estimated keypoints KP. For example, the position and attitude PAm are expressed by a position (x,y,z) and an attitude (w,p,r) in the robot coordinate system Zr. The attitude is expressed by rotation angles (w,p,r) around the three axes. In the example of FIG. 3, with respect to the mth object OBm contained in the input image IM, position and attitude PAm are determined. Note that, depending on the placement of the object OBm in the input image IM, the object OBm in the position and attitude PAm not correctly determined exists. Also, in this case, it is preferable that the position and attitude recognition section 620 recognizes the position and attitude PAm with respect to at least one object OBm. The robot 100 executes picking work of the object OBm using the recognized position and attitude PAm according to the robot control program RP.

Figure 4:
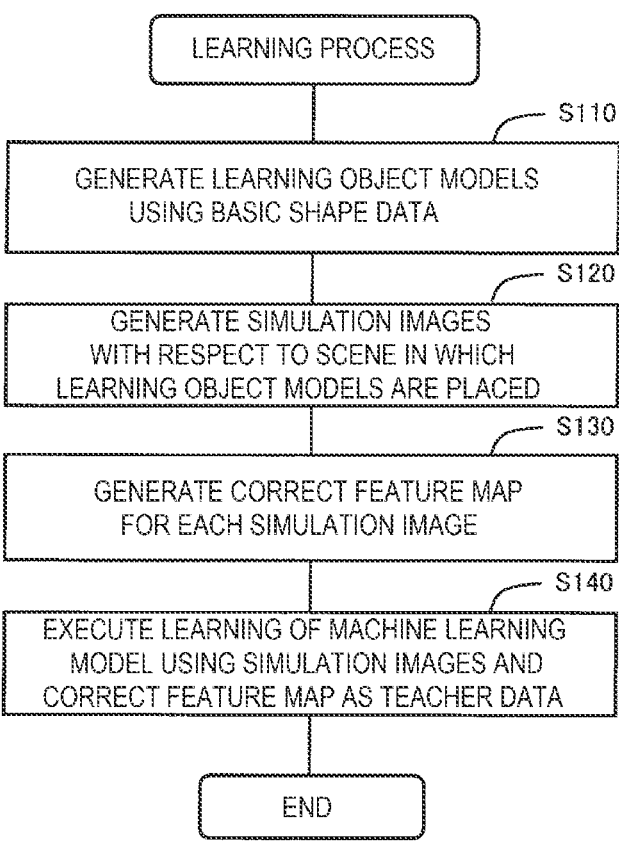
FIG. 4 is a flowchart showing a processing procedure of a learning process of a machine learning model.

FIG. 4 is a flowchart showing a processing procedure of a learning process of the machine learning model 630. This learning process is executed as a preparation process before practical operation using the robot 100. In the learning process, the robot 100 and the camera 400 are not necessary. Note that it is preferable that environmental conditions including the position relationship between the camera 400 and the object OB in the practical operation environment shown in FIG. 1 are known.

At step S110, the teacher data creation unit 612 generates a plurality of learning object models using the basic shape data BFD of the object OB. The plurality of learning object models are created by changing of at least part of the shape and the surface property with respect to the basic shape data BFD.

As a method of changing the shape of the object OB, for example, the following two methods may be used.
Shape Change Method M1

The coordinate values (x,y,z) of each position of the object OB are changed according to the following expressions.

[Math. 1]

$$x_{new} = x * S_x \qquad \text{[1a]}$$

$$y_{new} = y * S_y \qquad \text{[1b]}$$

$$z_{new} = z * S_z. \qquad \text{[1c]}$$

Here, $x_{new}$, $y_{new}$, $z_{new}$ are changed coordinate values and Sx, Sy, Sz are scale factors. The scale factors Sx, Sy, Sz may be set to the same value or different values. In a typical example, the scale factors Sx, Sy, Sz are respectively set to values in a range from 0.5 to 2.0. Further, to prevent excessive deformation, it is preferable to set the scale factor Sy in the y directions to a value within ±10% with reference to the scale factor Sx in the x directions. Similarly, it is preferable to set the scale factor Sz in the z direction to a value within ±30% with reference to the scale factor Sx in the x directions. In the shape change method M1, the object OB may be enlarged and reduced respectively in the x-axis directions, the y-axis directions, and the z-axis directions.

Shape Change Method M2

The x-coordinate value and the y-coordinate value of the coordinate values (x,y,z) of each position of the object OB are changed according to the following expressions.

[Math. 2]

$$x_{new} = x * \left( 1 + \frac{z - z_{min}}{h} * \frac{t}{2} \right) \qquad \text{[2a]}$$

$$y_{new} = y * \left( 1 + \frac{z - z_{min}}{h} * \frac{t}{2} \right). \qquad \text{[2b]}$$

Here, h is a height of the object OB, $z_{min}$ is the minimum value of the height coordinate of the object OB, and t is a taper factor. In a typical example, the taper factor t is set to a value in a range of ±1.0. In the shape change method M2, the object OB may be deformed to be a taper shape in which the size in the horizontal directions increases or decreases along the height directions.

Figure 5:
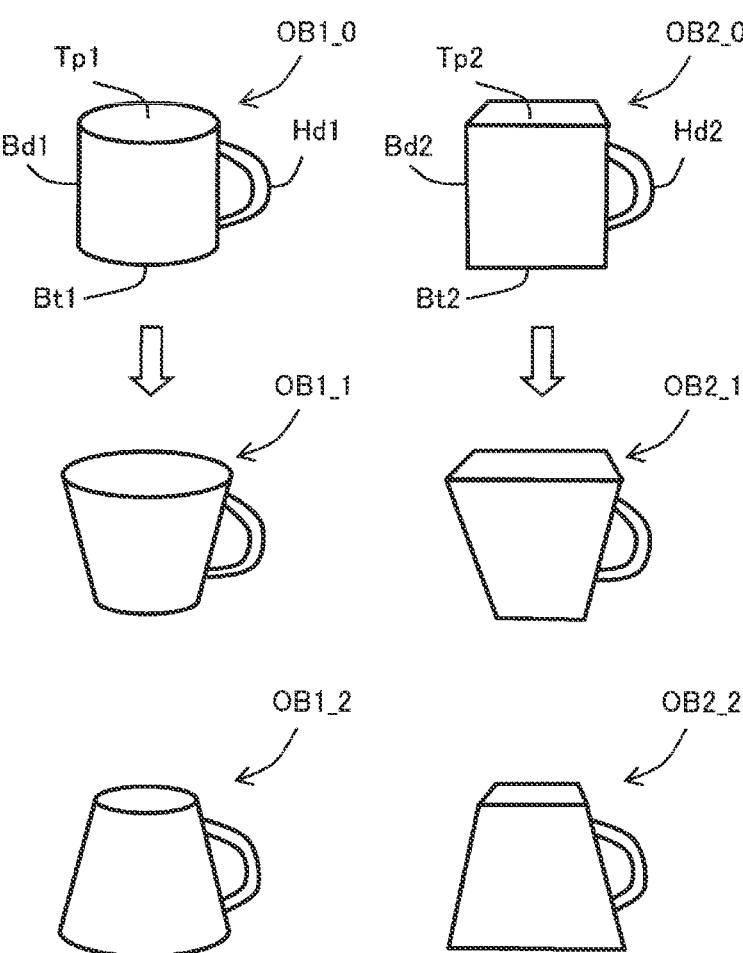
FIG. 5 is an explanatory diagram showing a plurality of learning object models.

FIG. 5 shows examples of various learning object models created by the above described shape change method M2. Here, two objects OB1_0, OB2_0 having basic shapes are used. These objects OB1_0, OB2_0 respectively have basic shapes before deformation. The first object OB1_0 is a mug having a circular tubular main body Bd1, a top opening Tp1, a bottom surface Bt1, and a handle Hd1. The second object OB2_0 is a mug having a rectangular tubular main body Bd2, a top opening Tp2, a bottom surface Bt2, and a handle Hd2. These two objects OB1_0, OB2_0 are objects having common shape features. That is, the two objects OB1_0, OB2_0 are common in the tubular main bodies, the top openings, the bottom surfaces, and the ring-shaped handles. In the present disclosure, a plurality of objects having common shape features are referred to as "object group belonging to the same category". The object group belonging to the same category may have different sizes, surface properties including colors, gloss levels, patterns, and partial shapes of the shape features.

FIG. 5 further shows objects OB1_1, OB1_2, OB2_1, OB2_2 deformed by the above described shape change method M2. These are obtained by deformation of the objects OB1_0, OB2_0 having the basic shapes into taper shapes. All of the objects OB1_0, OB2_0 having the basic shapes and the deformed objects OB1_1, OB1_2, OB2_1, OB2_2 can be used as learning object models.

It is preferable that at least part of the plurality of learning object models have shapes obtained by changing of the basic shape of the object OB by a shape change method not a size change at the same magnification. "The size change at the same magnification" corresponds to a case where the scale factors Sx, Sy, Sz are set to equal values in the above described shape change method M1. The teacher data suitable for the machine learning model 630 used for recognition of the positions and attitudes of the objects OB having various shapes may be created using the learning object models having the shapes obtained by changing of the basic shapes of the objects OB by a shape change method not the size change at the same magnification.

The learning object models may be created by changing of the surface properties of the objects OB. The change of the surface property can be made by changing of e.g., colors, gloss levels, or patterns. That is, the teacher data creation unit 612 may create the plurality of learning object models by changing at least part of the shape and the surface property of the object OB using the basic shape data BFD of the object OB.

At step S120, the teacher data creation unit 612 creates a plurality of simulation images with respect to a plurality of scenes in which one or more learning object models are respectively placed in the environment in which the objects OB are to be placed. "The environment in which the objects OB are to be placed" refers to an interior of the first tray 510 in the example of FIG. 1. The simulation image is an image simulating an image captured by the camera 400.

FIG. 6 is an explanatory diagram showing simulation images SM1, SM2 created at step S120. In the first simulation image SM1, three learning object models OB_11 to OB_13 are placed. In the second simulation image SM2, four learning object models OB_21 to OB_24 and one non-object NOB are placed. The non-object NOB refers to an object not to be recognized in position and attitude. It is preferable to randomly determine the positions and attitudes of the learning object models OB and the non-object NOB. For example, to reproduce a state in which many learning object models OB are placed not to overlap with each other, the learning object models OB may be randomly dropped from above and placement close to reality may be simulated using a physical simulation of gravity drop, collision, etc. Note that, as the simulation image SM, an image in which one or more learning object models OB are placed is generated. In the embodiment, a camera generating a color image and a distance image is assumed as the camera 400, and the simulation image SM containing a color image and a distance image is generated. Note that, in the following explanation, the learning object model OB contained in the simulation image SM is also simply referred to as "object OB".

It is preferable that the teacher data creation unit 612 creates simulation images SM in a plurality of different environmental conditions. As the environmental conditions, presence or absence of the non-object NOB other than the learning object models OB and types, directions, intensity of ambient light and illumination light may be used. That is, it is preferable that the teacher data creation unit 612 creates many simulation images SM different from one another in one or more of the number of learning object models OB, the placement of the learning object models OB, and the environmental condition. Further, it is preferable that the simulation image SM is an image provided with simulated noise formed by simulation of noise contained in the image captured by the camera 400 in the real environment.

At step S130, the teacher data creation unit 612 generates a correct feature map for each simulation image SM. "Correct feature map" shows correct values of a feature map. "Feature map" is a map of feature amounts relating to the plurality of keypoints KP described in FIG. 3, and has an image area having the same size as the simulation image SM and the input image IM. The correct feature map is created to correspond to each simulation image SM. In the embodiment, the correct feature maps are created for one or more of the plurality of types of feature maps, which will be described later:

(1) Heat Map;

(2) Directional Vector Map;

(3) Keypoint Distance Map;

(4) Noiseless Distance Map;

(5) Affinity Field Map;

(6) Semantic Field Map; and (7) Semantic Structure Mask Map.

Figure 7:
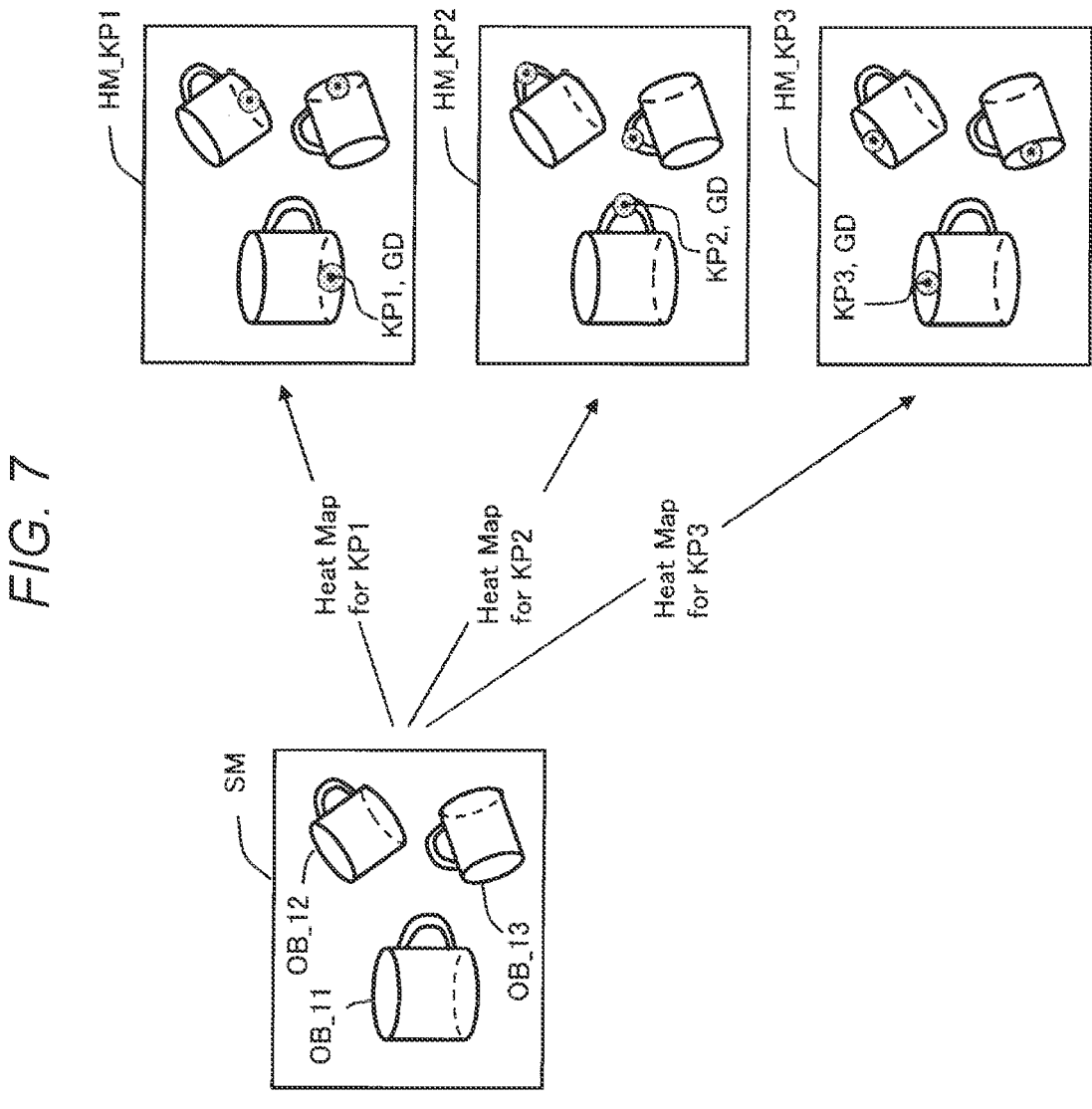
FIG. 7 is an explanatory diagram showing heat maps as a first type of feature maps.

FIG. 7 is an explanatory diagram showing heat maps HM as a first type of feature maps. The heat map HM as a correct feature map is created to correspond to each of the N keypoints KP. That is, N heat maps HM corresponding to the N keypoints KP are created for one simulation image SM. The heatmap HM is a map in which pixel values are reduced in a particular distribution profile according to the distance of each keypoint KP from a center position. As the particular distribution profile, e.g., a Gaussian distribution may be used. In the example of FIG. 7, a Gaussian distribution GD is drawn in the center position of each keypoint KP. The heat map HM is not for precisely estimating the center position of the key point KP, but for showing an area where the existence probability of the keypoint KP is high. The heat map HM is used, and thereby, the position of the keypoint KP may be robustly estimated even when there is some error in the input image IM captured by the camera 400.

Figure 8:
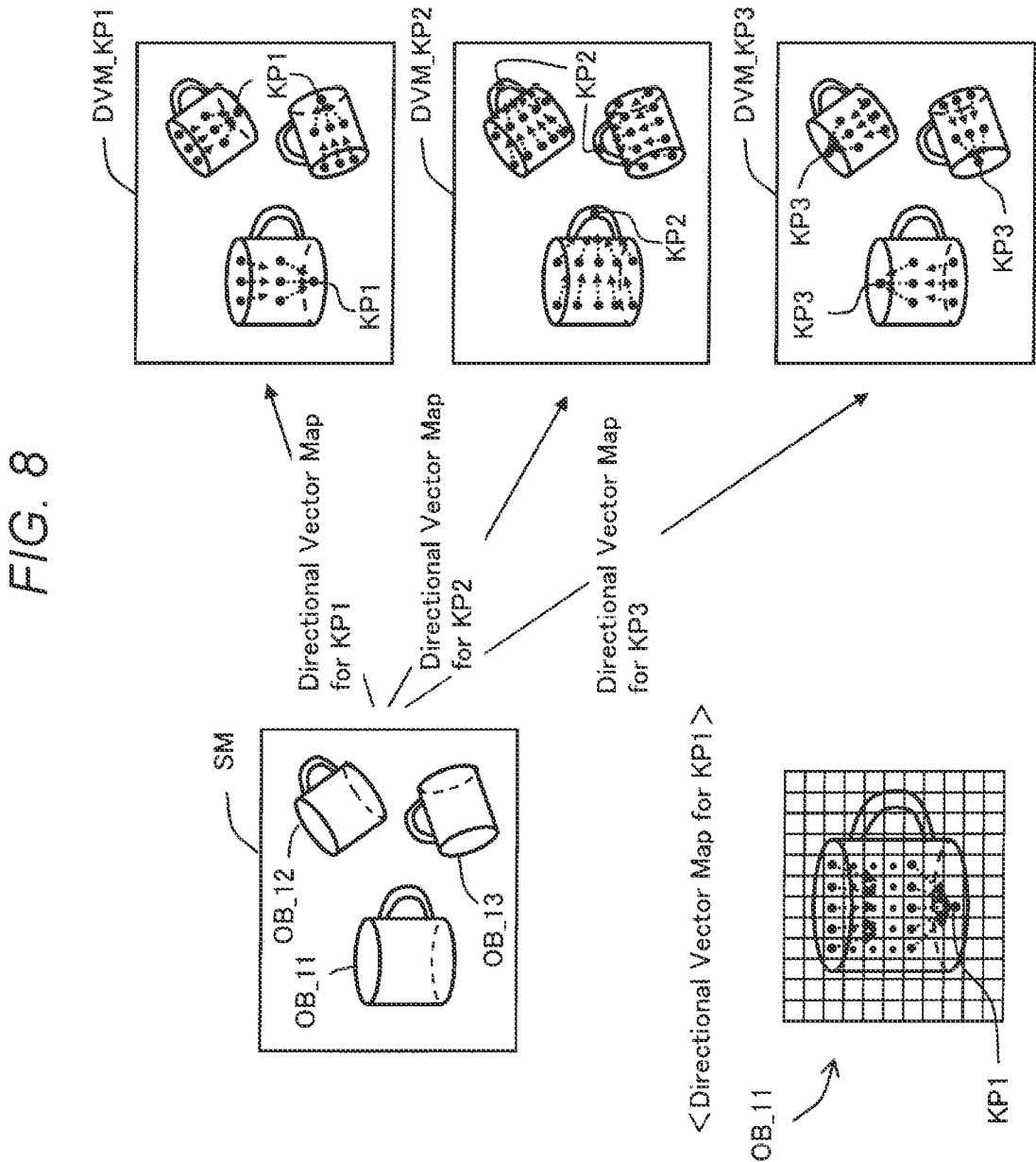
FIG. 8 is an explanatory diagram showing directional vector maps as a second type of feature maps.

FIG. 8 is an explanatory diagram showing directional vector maps DVM as a second type of feature maps. The directional vector map DVM as a correct feature map is created to correspond to each of the N keypoints KP like the heat map HM. when j is an integer from 1 to N, the jth directional vector map DVM is a map with the jth keypoint KPj as an object keypoint, in which vectors indicating directions from the respective all pixels belonging to the same object OB toward the object keypoint KPj are assigned to the respective pixels. For example, as shown in FIG. 8 below the simulation image SM, the directional vector map DVM corresponding to the first keypoint KP1 within the object OB_11 contains vectors indicating directions from the respective pixels belonging to the same object OB_11 toward the keypoint KP1. The same applies to the directional vector map DVM corresponding to the second and subsequent keypoints KP. Note that, in FIG. 8, for convenience of explanation, only vectors from part of the pixels belonging to the same object OB toward the keypoint KP are drawn with respect to each keypoint KP. The vector in the directional vector map DVM is a vector indicating a two-dimensional direction within the image area.

Figure 9:
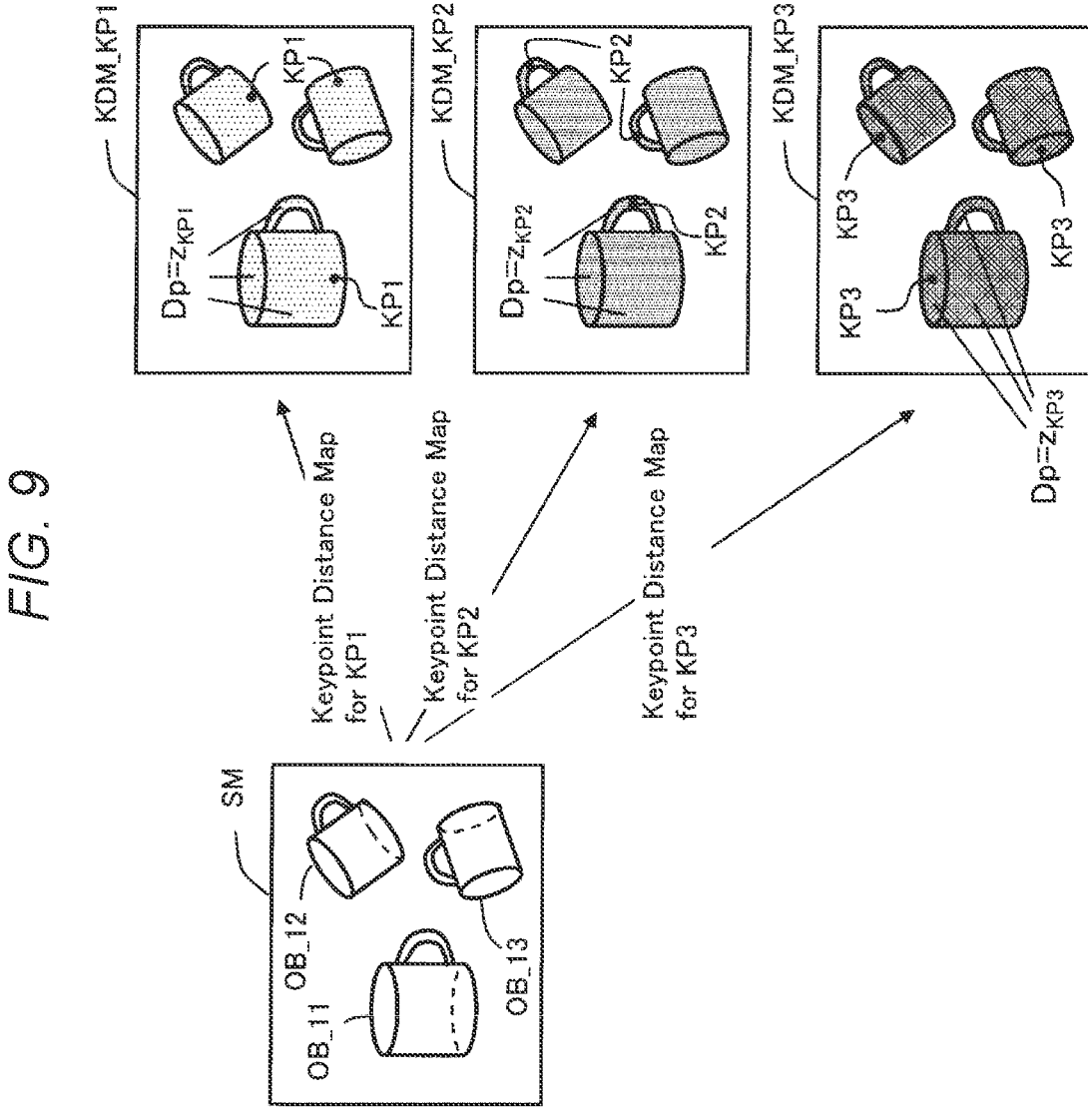
FIG. 9 is an explanatory diagram showing keypoint distance maps as a third type of feature maps.

FIG. 9 is an explanatory diagram showing keypoint distance maps KDM as a third type of feature maps. The keypoint distance map KDM as a correct feature map is created to correspond to each of the N keypoints KP like the directional vector map DVM. The keypoint distance map KDM is a map showing a distance $z_{KPj}$ from the camera 400 to the object keypoint KPj. That is, the same distance z KP j is assigned as a pixel value Dp to all pixels belonging to the same object OB. For example, in a keypoint distance map KDM KP1 corresponding to the first keypoint KP1, fixed pixel values Dp indicating distances $z_{KP1}$ from the camera 400 to the first keypoint KP1 are assigned for a plurality of pixels belonging to each object OB. The keypoint distance map KDM may be generated as a z channel of another map such as the directional vector map DVM shown in FIG. 8.

Figure 10:
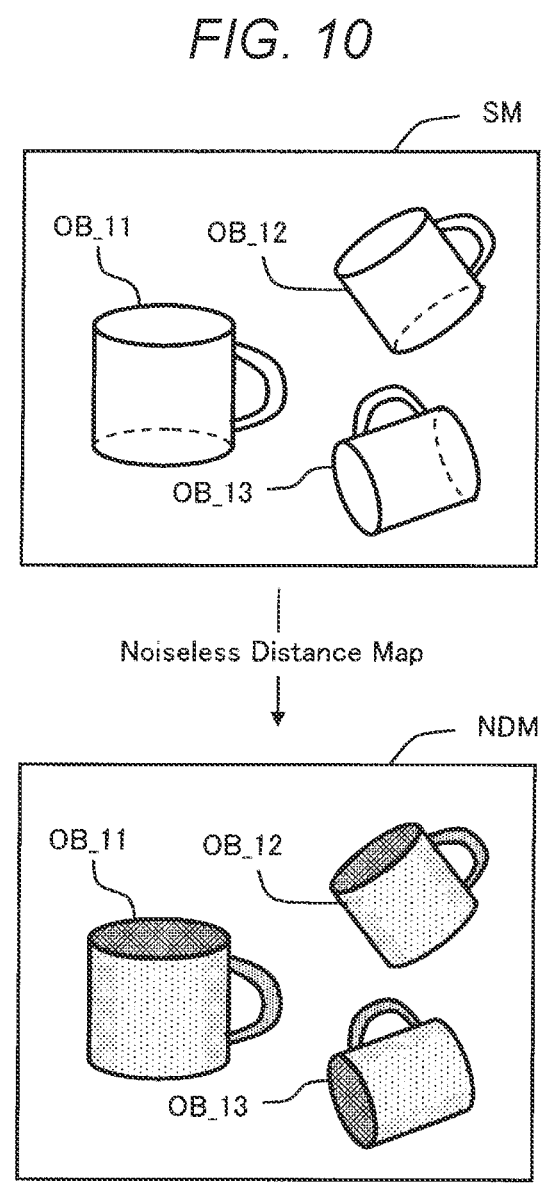

FIG. 10 is an explanatory diagram showing a noiseless distance map NDM as a fourth type of feature map. In a distance image generated by the camera 400, various kinds of noise may be generated. The noiseless distance map NDM as a correct feature map is a distance map without noise showing a distance from the camera 400 with respect to each pixel. The noiseless distance map NDM is used, and thereby, correct distance information without noise can be estimated and lowering of the estimation accuracy due to a lack of distance information may be prevented. One noiseless distance map NDM as the correct feature map is created for one simulation image SM. More precisely, one noiseless distance map NDM is created for one distance image contained in one simulation image SM. As described above, the distance image contained in the simulation image SM is provided with noise. In practice, the noiseless distance map NDM as the correct feature map is first created, the noiseless distance map NDM is provided with noise, and thereby, the distance image of the simulation image SM is created.

When the recognition of the positions and attitudes of the objects OB shown in FIG. 3 are executed, the noiseless distance map NDM as a feature map CM is generated from the input image IM by the machine learning model 630. Note that the noiseless distance map NDM contains a certain level of noise. As understood from the example, the noiseless distance map NDM obtained when the recognition of the positions and attitudes is executed refers to a map with less noise than the distance image contained in the input image IM and may contain a certain level of noise.

The keypoint distance map KDM described in FIG. 9 and the noiseless distance map NDM described in FIG. 10 have in common that both maps show distances from the camera 400 to a plurality of pixels belonging to each object OB. In the present disclosure, the term "distance map" is used in the meaning including both the keypoint distance map KDM and the noiseless distance map NDM. The values of these distance maps may be used for estimation of the distances from the camera 400 to the plurality of keypoints KP and may be considered as feature amounts relating to the plurality of keypoints KP.

Figure 11:
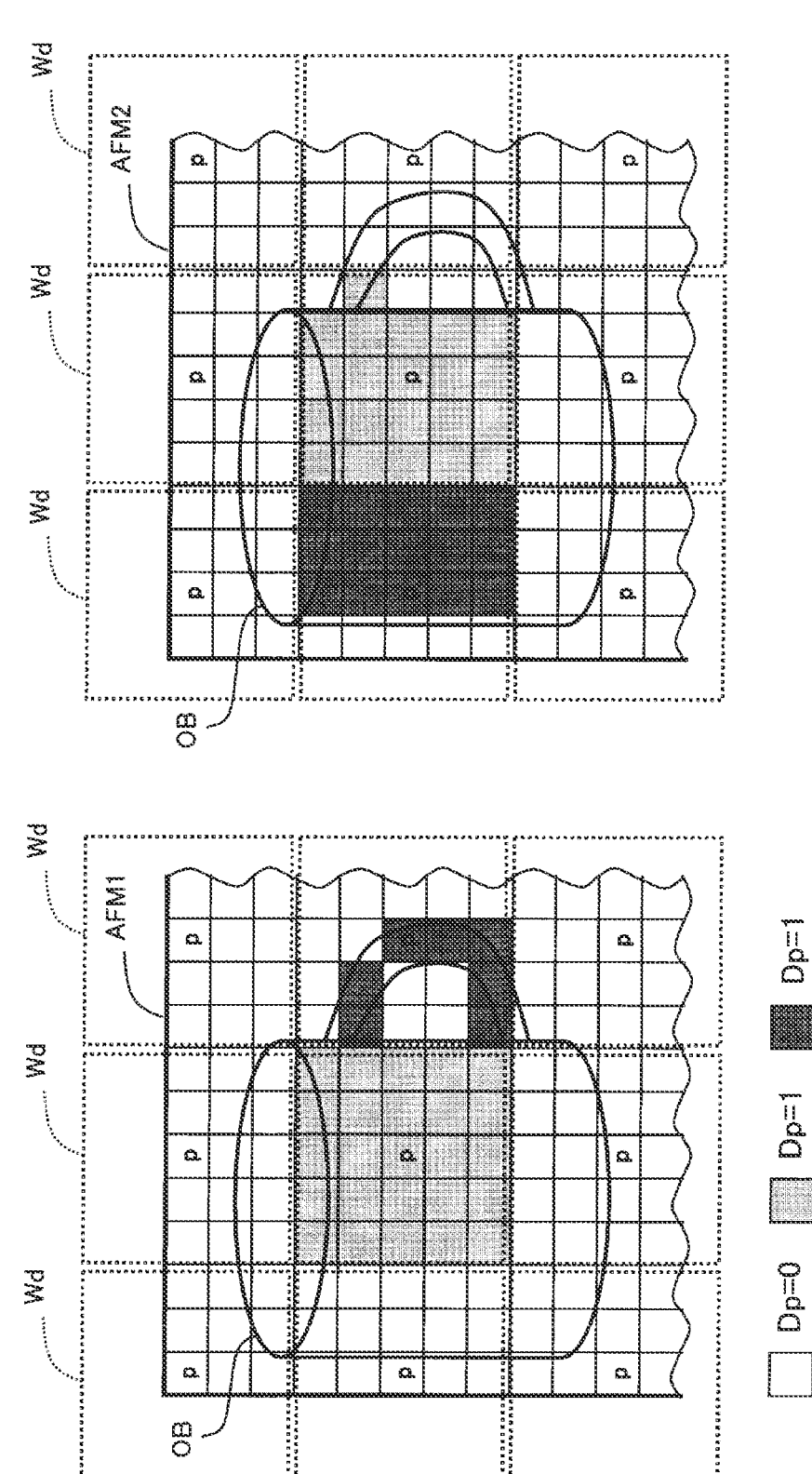
FIG. 11 is an explanatory diagram showing affinity field maps as a fifth type of feature maps.

FIG. 11 is an explanatory diagram showing affinity field maps AFM as a fifth type of feature maps. The affinity field map AFM is a map showing whether the pixels belong to the same object OB. More specifically, the affinity field map AFM is a map of values indicating whether neighborhood pixels around a reference pixel p belong to the same object OB as the reference pixel p with respect to the reference pixels p in the neighborhood windows Wd. In FIG. 11, two affinity field maps AFM1, AFM2 are exemplified. In these affinity field maps AFM1, AFM2, the neighborhood windows Wd are placed in tile forms. p shows the reference pixel set at the center of each neighborhood window Wd. In this example, the neighborhood window Wd has a size of 5×5 pixels, however, may have another size such as 3×3 pixels or 7×7 pixels. In the first affinity field map AFM1, the neighborhood windows Wd are placed so that the pixel on the upper left end of the image areas can be the reference pixel p of the neighborhood window Wd. As the pixel values Dp of the pixels within each neighborhood window Wd, when the pixel belongs to the same object OB as the reference pixel p, "1" is assigned and, when the pixel does not belong to the same object OB as the reference pixel p, "0" is assigned. Further, when the reference pixel p is in a background area, "0" is assigned to the pixel values Dp of all pixels within the neighborhood window Wd. In FIG. 11, the pixels to which "1" is assigned as the pixel values Dp are hatched and the pixels to which "0" is assigned as the pixel values Dp are not hatched. The second affinity field map AFM2 is formed by shifting of the positions of the neighborhood windows Wd from the first affinity field map AFM1 one by one. Generally, when the neighborhood window Wd contains Q pixels, Q affinity field maps AFM are created for one simulation image SM. In the example of FIG. 11, the neighborhood window Wd contains 25 pixels, and 25 affinity field maps AFM are created for one simulation image SM. These affinity field maps AFM may be used when the plurality of keypoints KP are grouped with respect to each same object OB.

Figure 12:
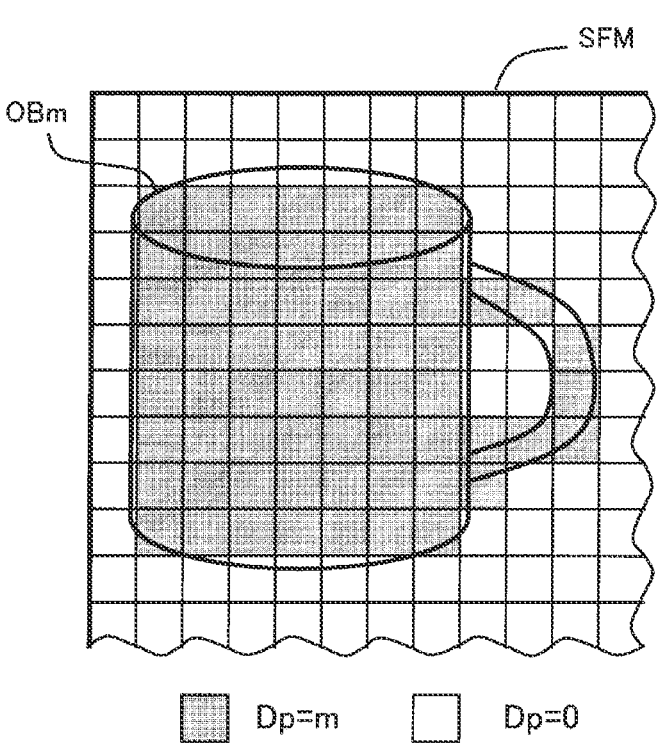
FIG. 12 is an explanatory diagram showing a semantic field map as a sixth type of feature map.

FIG. 12 is an explanatory diagram showing a semantic field map SFM as a sixth type of feature map. The semantic field map SFM is a map showing whether the pixels belong to the same object OB like the affinity field map AFM. Note that the semantic field map SFM is a map not using the neighborhood windows Wd, in which pixel values Dp indicating whether the pixels belong to the same object OB are assigned to the respective pixels within the image area having the same size as the simulation image SM. For example, when the simulation image SM contains M objects OB, pixel values Dp from 1 to M are respectively assigned to the M object areas. In the example of FIG. 12, the pixel value Dp=m is assigned to the respective pixels belonging to the mth object OBm. The semantic field map SFM is equal to classification of the image area by execution of the so-called semantic segmentation on the image. One semantic field map SFM as the correct feature map is created for one simulation image SM.

The affinity field map AFM described in FIG. 11 and the semantic field map SFM described in FIG. 12 have in common that both maps show whether the pixels belong to the same object OB. In the present disclosure, the term "field map" is used in the meaning including both the affinity field map AFM and the semantic field map SFM. The values of these field maps may be used for determination as to whether the plurality of keypoints KP belong to the same object OB and may be considered as feature amounts relating to the plurality of keypoints KP.

Figure 13:
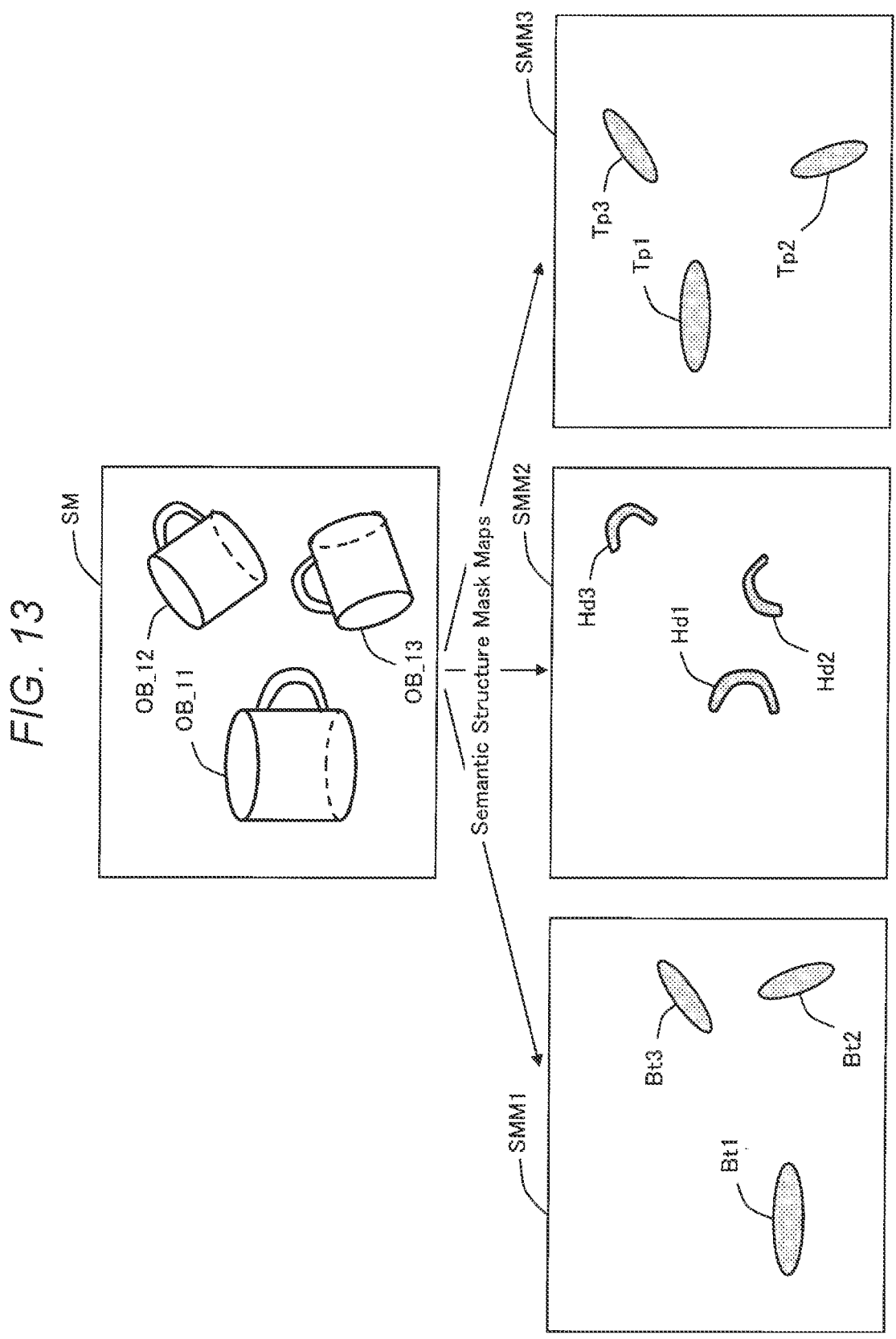
FIG. 13 is an explanatory diagram showing semantic structure mask maps as a seventh type of feature maps.

FIG. 13 is an explanatory diagram showing semantic structure mask maps SMM as a seventh type of feature maps. The semantic structure mask map SMM is a map showing masks formed by division of the objects OB in meaningful portions. In the example of FIG. 13, masks respectively showing areas of the top opening Tp, the bottom surface Bt, and the handle Hd are set for each object OB contained in the simulation image SM. As masks, it is preferable to set masks showing N feature shapes corresponding to at least N keypoints KP. Note that a mask for a portion in which the keypoint KP is not set may be added. For example, in the example of the object OB1_0 shown in FIG. 5, a mask with respect to the main body Bd1 may be added. As the semantic structure mask map SMM, at least N maps corresponding to the N keypoints KP are created for one simulation image SM. The semantic structure mask map SMM may be used for estimation of the plurality of keypoints KP and may be considered as feature amounts relating to the plurality of keypoints KP.

At step S130 in FIG. 4, one or more of the plurality of correct feature maps corresponding to the above described plurality of feature maps are created for each simulation image SM. The simulation image SM is created by a simulation using the shape data of the object OB and the correct feature map is a feature map showing correct values corresponding to the simulation image SM.

At step S140, the learning execution unit 614 executes learning of the machine learning model 630 using the plurality of simulation images SM and correct feature maps corresponding thereto as teacher data. As described in FIG. 3, the machine learning model 630 is configured with the input image IM captured by the camera 400 as input and the feature map CM as output. In the embodiment, the machine learning model 630 is a neural network configured to output at least part of the above described seven types of feature maps for the input image IM containing the color image and the distance image. As the neural network, e.g., VAE (Variational Autoencoder) or U-Net can be used. The learning of the machine learning model 630 is performed by optimization of the neural network using an optimization technique such as stochastic gradient descent to minimize a difference between the feature map generated by the machine learning model 630 according to the input of the simulation image SM and the correct feature map as a loss function. In this regard, a neural network corresponding to each feature map can be created and individually learned. Further, accuracy may be increased by multitask learning of learning a plurality of types of feature maps using the same neural network. That is, the neural network may be configured so that all types of feature maps may be generated by one neural network.

According to the learning process of the above described embodiment, a plurality of learning object models with changes of at least part of the shape and the surface property of the object OB are generated and a plurality of simulation images SM relating to a plurality of scenes in which the models are placed are generated, and the correct feature maps corresponding thereto are generated. Therefore, even when the shapes and the surface properties of the objects OB change, the machine learning model 630 that may correctly estimate the feature maps may be appropriately learned.

Figure 14:
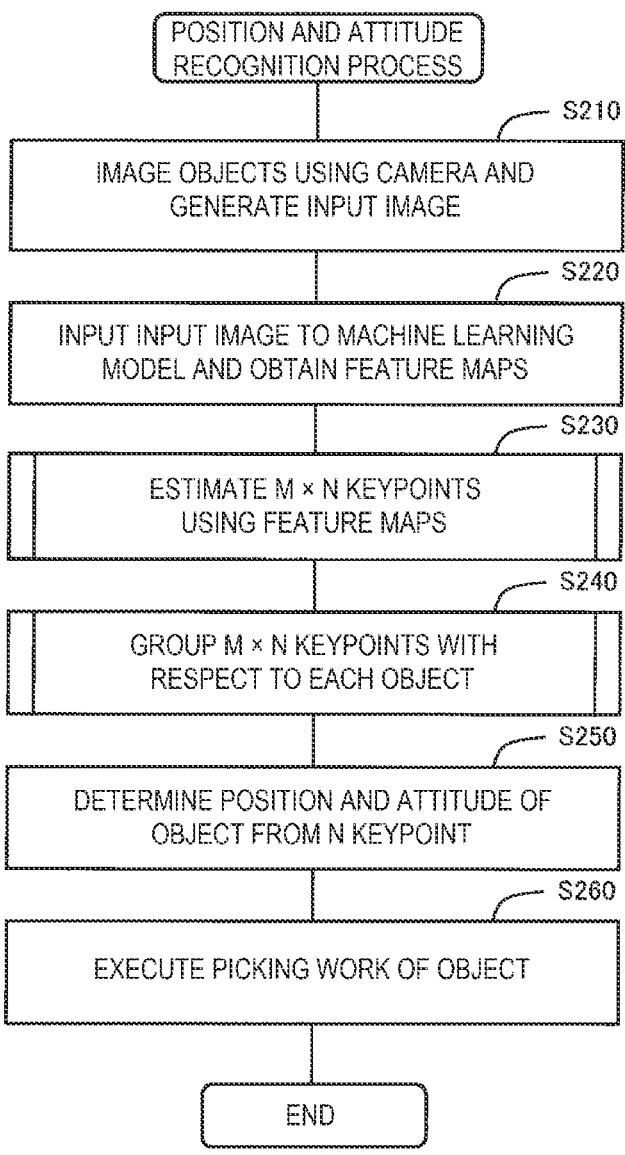
FIG. 14 is a flowchart showing a processing procedure of a position and attitude recognition process.

FIG. 14 is a flowchart showing a processing procedure of a position and attitude recognition process. The position and attitude recognition process is executed in the practical operation environment shown in FIG. 1.

At step S210, the keypoint estimation unit 622 generates the input image IM by imaging the scene containing the objects OB using the camera 400.

At step S220, the keypoint estimation unit 622 obtains the feature maps CM by inputting the input image IM to the learned machine learning model 630. It is preferable that the machine learning model 630 is configured to output a plurality of types of feature maps CM for one input image IM.

At step S230, the keypoint estimation unit 622 estimates a plurality of keypoints KP using the feature maps CM. In the embodiment, three-dimensional coordinates of M×N keypoints KP are estimated using the heat maps HM shown in FIG. 7 and the keypoint distance maps KDM shown in FIG. 9. Here, N is the number of keypoints KP set for one object OB and M is the number of objects OB for which all of the N keypoints KP may be estimated. N is an integer equal to or larger than 2 and preferably set to 3 or more. M is an integer equal to or larger than 1 and preferably set to an integer of 2 or more. Further, M is an integer equal to or smaller than the number of all objects OB contained in the input image IM. For example, when an object OB is hidden behind another object or non-object, the number M of the objects OB for which all of the N keypoints KP may be estimated is smaller than the number of all objects OB contained in the input image IM.

Figure 15:
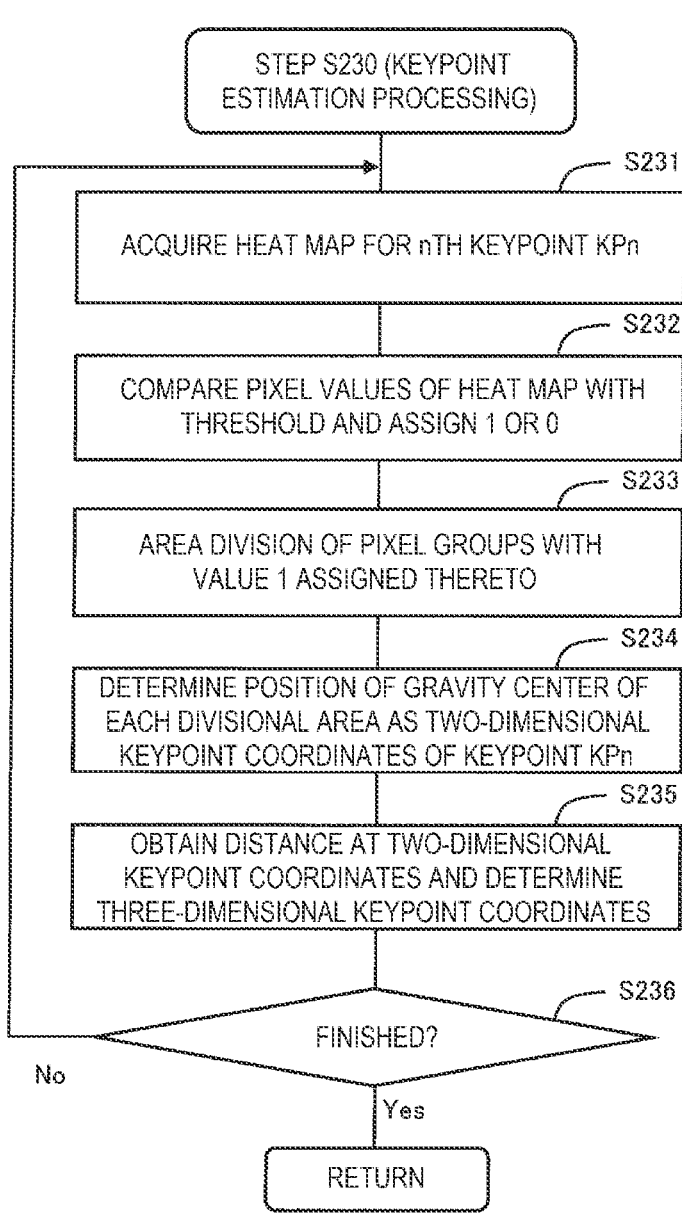
FIG. 15 is a flowchart showing a detailed procedure of keypoint estimation processing.

FIG. 15 is a flowchart showing a detailed procedure of step S230. At step S231, the keypoint estimation unit 622 acquires the heat map HM for the nth keypoint KPn. Here, n is an integer from 1 to N. The heat map HM is obtained as the feature map at step S220.

At step S232, the keypoint estimation unit 622 compares the pixel values of the heat map HM to a preset threshold and assigns "1" or "0" to the respective pixels. That is, when the pixel values of the respective pixels in the heat map HM are equal to or larger than the threshold, "1" is assigned to the pixels and, when the pixel values are smaller than the threshold, "0" is assigned to the pixels. For example, the threshold of the binarization processing is set in a range from 0.5 to 0.8. It is estimated that the pixels to which the value 1 is assigned by the binarization processing are neighborhood pixels and the pixels of the keypoints KP to which the value 0 is assigned are the other pixels. The processing at step S232 may be limitedly executed within the areas where the keypoints KP exist using the semantic structure mask maps SMM shown in FIG. 13. That is, in the example of FIG. 13, the semantic structure mask maps SMM contain the masks of the areas of the top openings Tp, the bottom surfaces Bt, and the handles Hd, and the processing at step S232 may be executed only within these mask areas.

At step S233, the keypoint estimation unit 622 areally divides the pixel group to which the value 1 is assigned at step S232 into a plurality of divisional areas. That is, the whole image area is divided into a plurality of divisional areas so that, of the pixels having the pixel values 1, the pixels adjacent to one another belong to the same divisional area.

At step S234, the keypoint estimation unit 622 determines a position of the gravity center of each divisional area divided at step S233 as two-dimensional keypoint coordinates (x,y) of the keypoint KP. The two-dimensional coordinates (x,y) of the keypoint KP are pixel coordinates in the image area having the same size as the input image IM.

However, the processing at steps S232 to S234 is not performed, but the pixel coordinates (x,y) having peak values of the heat map HM may be used as the two-dimensional coordinates (x,y) of the keypoints KP without change. Note that there is an advantage that the processing at steps S232 to S234 is performed, and thereby, even when there is some difference in the heat map HM obtained for the input image IM, the two-dimensional coordinates (x,y) of the keypoints KP may be correctly determined.

At step S235, the keypoint estimation unit 622 obtains a distance z from the camera 400 at the two-dimensional keypoint coordinates (x,y) and determines three-dimensional keypoint coordinates (x,y,z). In the processing at step S235, the keypoint distance map KDM described in FIG. 9 may be used. Specifically, for example, in each divisional area obtained in the processing at step S233, the z-coordinate value corresponding to the two-dimensional keypoint coordinates (x,y) may be determined by weighted averaging of the z-coordinate value obtained from the keypoint distance map KDM by the pixel value of the heat map HM. It is preferable that the three-dimensional keypoint coordinates (x,y,z) obtained in the above described manner are expressed by the camera coordinate system Σc.

However, the distance z corresponding to the two-dimensional keypoint coordinates (x,y) may be determined using the distance z in the keypoint distance map KDM at the two-dimensional keypoint coordinates (x,y) without change, without the above described weighted averaging. Note that there is an advantage that, the distance z is determined by the above described weighted averaging, and thereby, even when there is some difference in the heat map HM or the keypoint distance map KDM, the three-dimensional keypoint coordinates (x,y,z) may be accurately estimated. The above described processing at steps S231 to S235 is performed once, and thereby, M three-dimensional keypoint coordinates (x,y,z) are respectively determined with respect to the nth keypoint KPn.

At step S236, whether the processing at steps S231 to S235 is finished with respect to all of the first to the Nth keypoints KP is determined and, when the processing is not finished, the process returns to step S231 and the processing at steps S231 to S235 is repeated. In this manner, the processing with respect to the first to Nth keypoints KP is finished, three-dimensional keypoint coordinates (x,y,z) are obtained with respect to each of the M×N keypoints KP. Correlations of these M×N keypoints KP to the M objects are not determined. The correlations between each object OB and the N keypoints KP belonging thereto are determined by grouping processing, which will be described later.

Note that the estimation of the keypoints KP at step S230 may be performed using the other feature maps than the heat maps HM and the keypoint distance maps KDM. For example, the processing at step S235 can be performed using the noiseless distance maps NDM shown in FIG. 10 in place of the keypoint distance maps KDM.

At step S240 in FIG. 14, the keypoint estimation unit 622 groups the M×N keypoints KP estimated at step S230 with respect to each object OB. That is, the M×N keypoints KP are grouped into N keypoints KP respectively belonging to the M objects OB. As the feature maps used at step S240, e.g., the directional vector maps DVM shown in FIG. 8 and the affinity field maps AFM shown in FIG. 11 may be used.

FIG. 16 is a flowchart showing a detailed procedure of step S240. At step S241, the keypoint estimation unit 622 selects one keypoint KPi as a processing object from the M ith keypoints KPi and selects one keypoint KPj as a processing object from the M jth keypoints KPj. Here, i, j are integers from 1 to N different from each other.

At step S242, the keypoint estimation unit 622 calculates a first degree of conformance Dc1 of the ith keypoint KPi and the jth keypoint KPj.

FIG. 17 is a flowchart showing a detailed procedure of step S242, and FIG. 18 is an explanatory diagram showing details of the processing. At step S21, the keypoint estimation unit 622 obtains a first vector V1 from the pixel position of the ith keypoint KPi toward the jth keypoint KPj using the jth directional vector map DVM. "The pixel position of the ith keypoint KPi" refers to a position of the pixel coordinates (x,y) expressed by the three-dimensional coordinates (x,y,z) of the ith keypoint KPi. "The first vector V1 toward the jth keypoint KPj" is obtained with reference to the jth directional vector map DVM.

FIG. 18 shows the details of processing at step S21 when i=1 and j=3. The upper part of FIG. 18 shows that the first vector V1 from the pixel position $(x_{KP1}, y_{KP1})$ of the first keypoint KP1 of the object OB1 toward the third keypoint KP3 using the directional vector map DVM KP3 relating to the third keypoint KP3. As described in FIG. 8, the third directional vector map DVM KP3 is a map in which vectors indicating the directions from the respective pixels belonging to the same object OB toward the third keypoint KP3 are assigned to the respective pixels with respect to each third keypoint KP3. Therefore, in the example of FIG. 18, in the directional vector map DVM KP3, the first vector V1 may be obtained with reference to the pixel position $(x_{KP1}, y_{KP1})$ of the first keypoint KP1 of the object OB1.

At step S22, the keypoint estimation unit 622 obtains a second vector V2 from the pixel position of the ith keypoint KPi toward the pixel position of the jth keypoint KPj. Here, the pixel position of the ith keypoint KPi and the pixel position of the jth keypoint KPj refer to the pixel position (x,y) expressed by the three-dimensional coordinates (x,y,z) obtained in the processing at step S230. In the lower part of FIG. 18, the second vector V2 obtained when i=1, j=3 is drawn and the first vector V1 is also drawn by a dotted line for convenience of explanation. The second vector V2 is a vector from the pixel position $(x_{KP1}, y_{KP1})$ of the first keypoint KP1 toward the pixel position $(x_{KP3}, y_{KP3})$ of the third keypoint KP3. In this example, the first keypoint KP1 belongs to the first object OB1 and the third keypoint KP3 belongs to the second object OB2, and the second vector V2 is in a different direction from the first vector V1.

At step S23, the keypoint estimation unit 622 calculates a first degree of conformance Dc1 indicating the degree of coincidence of the directions of the first vector V1 and the second vector V2. For example, the first degree of conformance Dc1 may be calculated by the following expression.

[Math. 3]

$$D_{c1} = e^{-(D1-D2)^2}. \qquad [3]$$

Here, D1 is the direction of the first vector V1, D2 is the direction of the second vector V2, and (D1–D2) corresponds to an angle θ formed by the two vectors V1, V2.

A degree of cosine similarity of the two vectors V1, V2 may be calculated as the first degree of conformance Dc1 using the following expression in place of the above expression [3].

[Math. 4]

$$D_{c1} = \cos\theta = \frac{V1 \cdot V2}{|V1| |V2|}. \qquad [4]$$

As a function for obtaining the first degree of conformance Dc1, another function than those of the above described expression [3] and expression [4] may be used. Note that it is preferable to use a function having a value that decreases according to the lowering of the degree of coincidence of the directions of the two vectors V1, V2. In the embodiment, the first degree of conformance Dc1 is obtained using the expression [3]. Therefore, the first degree of conformance Dc1 has a value from 0 to 1.

At step S243 in FIG. 16, the keypoint estimation unit 622 calculates a second degree of conformance Dc2 of the ith keypoint KPi and the jth keypoint KPj. Calculation processing of the second degree of conformance Dc2 at step S243 corresponds to processing in which "ith keypoint KPi" and "jth keypoint KPj" of the calculation processing of the first degree of conformance Dc1 at step S242 are exchanged to each other and "first vector" and "second vector" are replaced by "third vector" and "fourth vector" respectively.

FIG. 19 shows the third vector V3 and the fourth vector V4 used for calculation of the second degree of conformance Dc2 as an example when i=1, j=3 as is the case in FIG. 18. The third vector V3 is a vector obtained from the ith directional vector map DVM indicating a direction from the pixel position of the jth keypoint KPj toward the ith keypoint KPi. In the example of FIG. 19, the third vector V3 indicating a direction from the pixel position $(x_{KP3}, y_{KP3})$ of the third keypoint KP3 toward the first keypoint KP1 with reference to the first directional vector map DVM KP1. The fourth vector V4 is vector indicating a direction from the pixel position (x,y) expressed by the three-dimensional coordinates (x,y,z) of the jth keypoint KPj to the pixel position (x,y) expressed by the three-dimensional coordinates (x,y,z) of the ith keypoint KPi. In the example of FIG. 19, the fourth vector V4 from the pixel position $(x_{KP3}, y_{KP3})$ of the third keypoint KP3 toward the pixel position $(x_{KP1}, y_{KP1})$ of the first keypoint KP1 is obtained. The second degree of conformance Dc2 is a degree of conformance indicating the degree of coincidence of the directions of the third vector V3 and the fourth vector V4 and calculated using the same functions as those of the above described expression [3] and expression [4].

At step S244, the keypoint estimation unit 622 calculates an integrated degree of conformance Dct obtained by integration of the first degree of conformance Dc1 and the second degree of conformance Dc2. The integrated degree of conformance Dct may be calculated by e.g., summing, averaging, multiplication, or the like of the first degree of conformance Dc1 and the second degree of conformance Dc2. In the embodiment, the integrated degree of conformance Dct is obtained by simple averaging of the first degree of conformance Dc1 and the second degree of conformance Dc2. The first degree of conformance Dc1 and the second degree of conformance Dc2 respectively take values from 0 to 1, and the integrated degree of conformance Dct takes a value from 0 to 1.

At step S245, the keypoint estimation unit 622 determines whether an integrated degree of conformance Dct of the first vector V1 and the second vector V2 is equal to or higher than a preset threshold Th. The threshold Th is set to e.g., a value from 0.90 to 0.98. When the integrated degree of conformance Dct is equal to or higher than the threshold Th, it is estimated that the two keypoints KPi, KPj as processing objects belong to the same object OB, and the process goes to step S246, which will be described later. On the other hand, when the integrated degree of conformance Dct is lower than the threshold Th, it is estimated that the two keypoints KPi, KPj do not belong to the same object OB, and the process goes to step S247. At step S247, the keypoint estimation unit 622 adjusts the integrated degree of conformance Dct of the two keypoints KPi, KPj to a first value Da. The first value Da is set to e.g., the minimum degree of conformance value that may be taken by the integrated degree of conformance Dct. In the embodiment, the integrated degree of conformance Dct may take a value in a range from 0 to 1, and the first value Da is set to 0. Note that, as the first value Da, the original integrated degree of conformance Dct may be used without change.

At step S246, the keypoint estimation unit 622 estimates whether the two keypoints KPi, KPj belong to the same object OB using a field map. As the field map, one of the affinity field map AFM shown in FIG. 11 and the semantic field map SFM shown in FIG. 12 can be used. In the embodiment, the affinity field map AFM is used.

Figure 20:
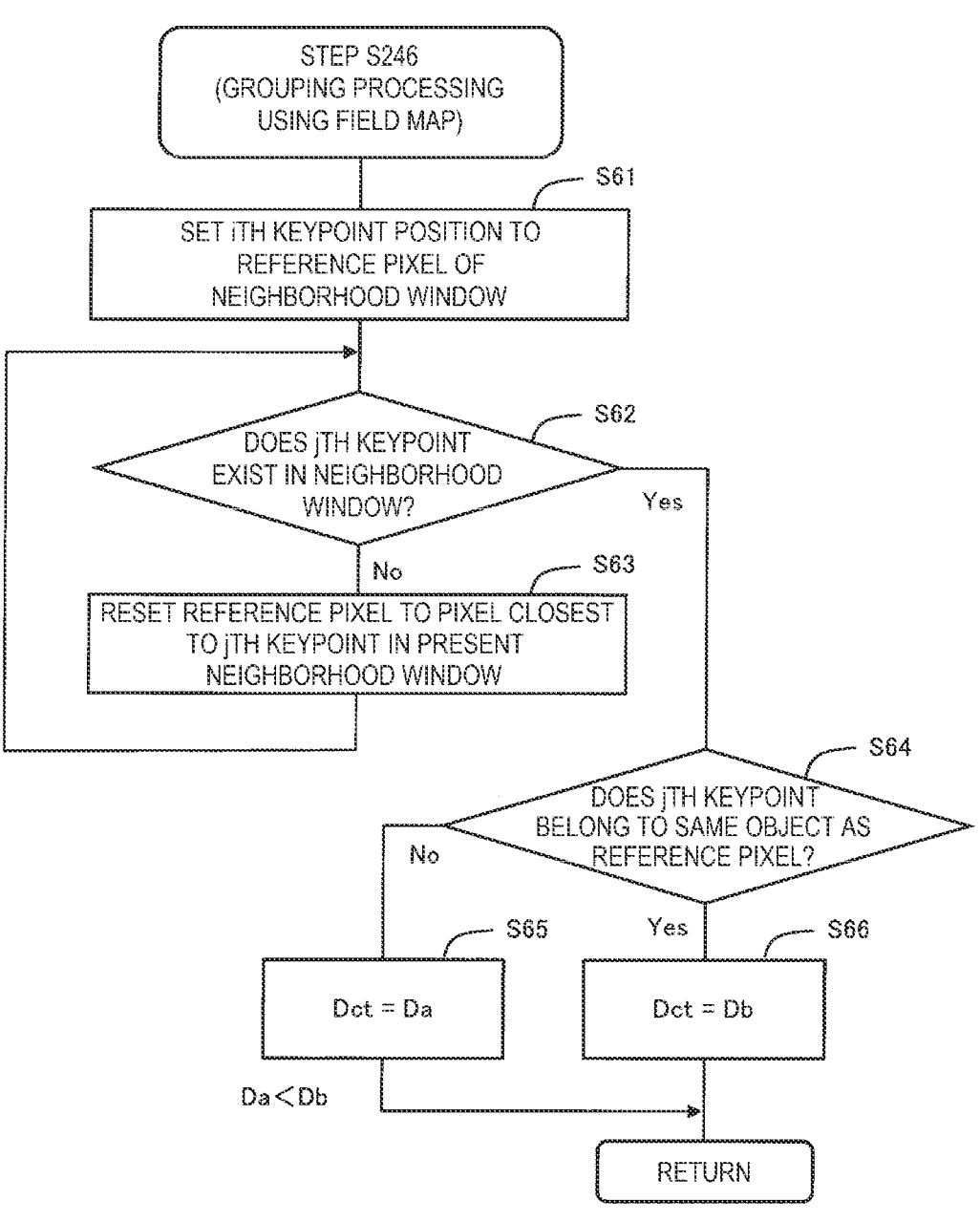
FIG. 20 is a flowchart showing a procedure of grouping processing using a field map.
Figure 21:
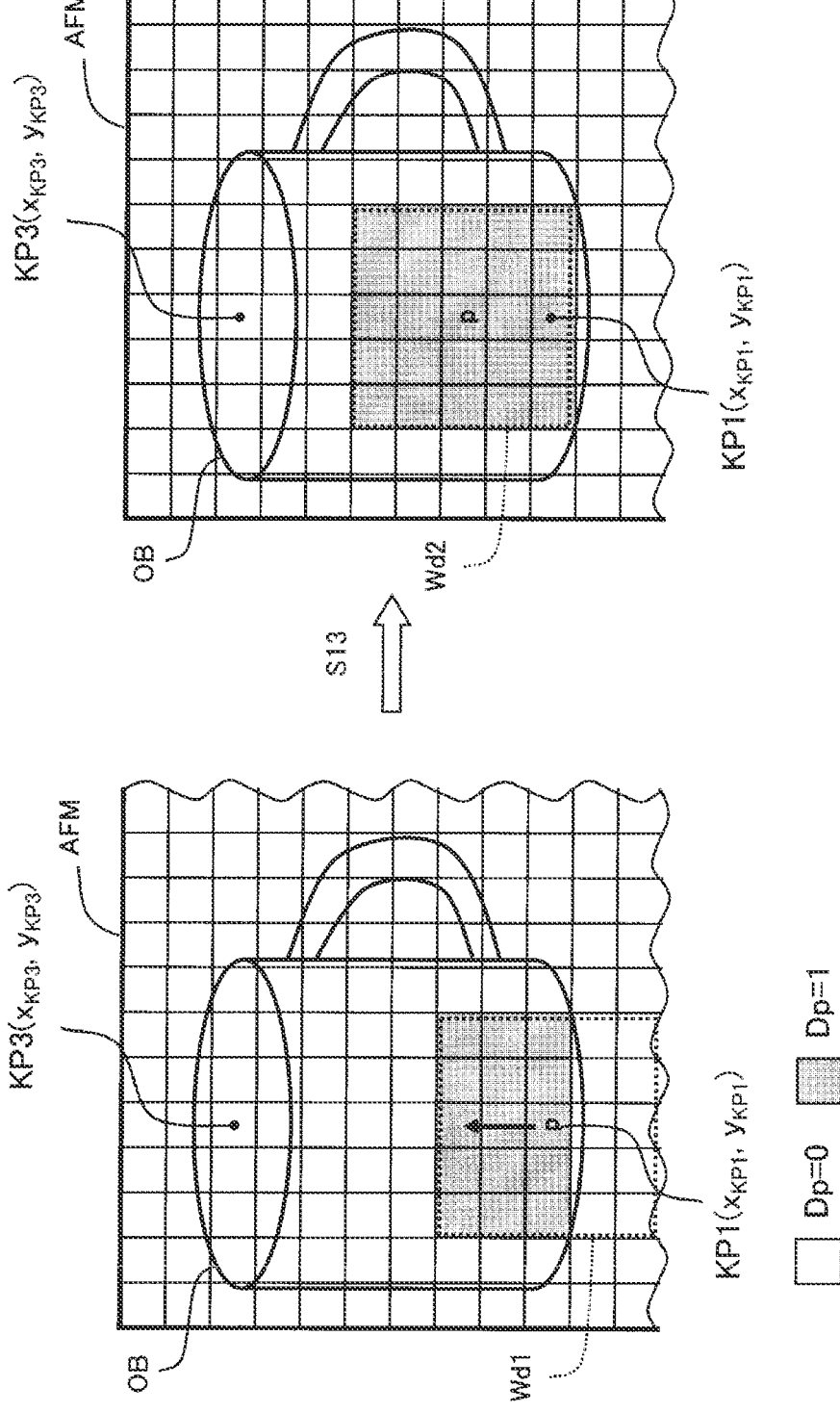
FIG. 21 is an explanatory diagram showing details of the grouping processing using a field map.

FIG. 20 is a flowchart showing a detailed procedure of step S246, and FIG. 21 is an explanatory diagram showing details of processing at step S246. At step S61, the keypoint estimation unit 622 sets the position of the ith keypoint KPi to the reference pixel p of the neighborhood window Wd in the affinity field map AFM. In the left example of FIG. 21, the position $(x_{KP1}, y_{KP1})$ of the first keypoint KP1 is set to the position of the reference pixel p of the neighborhood window Wd1. In practice, the processing at step S61 is processing of selecting one affinity field map AFM in which the position $(x_{KP1}, y_{KP1})$ of the first keypoint KP1 is the reference pixel p of the neighborhood window Wd from the plurality of affinity field maps AFM exemplified in FIG. 11. Note that the example in FIG. 21 is an example when the third keypoint KP3 belonging to the same object OB as the first keypoint KP1 is selected as the jth keypoint KPj.

At step S62, the keypoint estimation unit 622 determines whether the jth keypoint KPj exists in the neighborhood window Wd. In the left example of FIG. 21, whether the third keypoint KP3 exists in the neighborhood window Wd1 is determined. In this example, the third keypoint KP3 does not exist in the neighborhood window Wd1. When the jth keypoint KPj does not exist in the neighborhood window Wd, the process goes to step S63.

At step S63, the keypoint estimation unit 622 resets the reference pixel p to a pixel closest to the jth keypoint KPj of the pixels having the pixel values Dp=1 contained in the present neighborhood window Wd. In the left example of FIG. 21, the pixel closest to the third keypoint KP3 of the pixels having the pixel values Dp=1 contained in the present neighborhood window Wd1 is a pixel at the upside of the position of the first keypoint KP1 by two pixels. Accordingly, at step S63, as shown by the right example of FIG. 21, the reference pixel p and a neighborhood window Wd2 are reset in the position at the upside by two pixels, and the affinity field map AFM corresponding thereto is selected. The left affinity field map AFM and the right affinity field map AFM in FIG. 21 are different maps, however, for convenience of illustration, have the same sign "AFM". In this manner, step S62 and step S63 are repeatedly executed until the jth keypoint KPj exists in the neighborhood window Wd.

At step S62, when the jth keypoint KPj exists in the neighborhood window Wd, the process goes to step S64 and the keypoint estimation unit 622 determines whether the jth keypoint KPj belongs to the same object OB as the reference pixel p of the neighborhood window Wd. Specifically, in the affinity field map AFM, when the pixel value Dp at the jth keypoint KPj is 1, a determination that the point belongs to the same object OB as the reference pixel p is made, and, when the pixel value Dp is 0, a determination that the point does not belong to the same object OB as the reference pixel p is made. When the jth keypoint KPj does not belong to the same object OB as the reference pixel p of the neighborhood window Wd, the process goes to step S65 and the integrated degree of conformance Dct is adjusted to a first value Da. On the other hand, when the jth keypoint KPj belongs to the same object OB as the reference pixel p of the neighborhood window Wd, the process goes to step S66, and the integrated degree of conformance Dct is adjusted to a second value db higher than the first value Da. As the first value Da, the same value as the first value Da used at step S247 in FIG. 16 may be used or a different value may be used. Or, as the first value Da, a value of the original integrated degree of conformance Dct may be used without change. The first value Da used at step S65 is set to e.g., the minimum degree of conformance value that may be taken by the integrated degree of conformance Dct. The second value db used at step S66 is set to e.g., the maximum degree of conformance value that may be taken by the integrated degree of conformance Dct. In the embodiment, the integrated degree of conformance Dct may take a value in a range from 0 to 1, and the first value Da is set to 0 and the second value db is set to 1. Note that, as long as the first value Da and the second value db may have a relationship Da<db, other values than the minimum degree of conformance value and the maximum degree of conformance value may be used.

As described above, in the processing at step S246, whether the two keypoints KPi, KPj belong to the same object OB may be estimated using the affinity field map AFM and the value of the integrated degree of conformance Dct may be adjusted according thereto.

Note that the semantic field map SFM shown in FIG. 12 can be used in place of the affinity field map AFM. In this case, the processing of repeating steps S62, S63 in FIG. 15 is not necessary and whether the two keypoints KPi, KPj belong to the same object OB can be estimated in the single processing.

Returning to FIG. 16, when the processing at step S246 or step S247 is finished, the process goes to step S248. At step S248, whether processing with respect to all combinations of the ith keypoint KPi and the jth keypoint KPj is finished is determined. When the processing is not finished, the process returns to step S241 and the processing at steps S241 to S247 is repeated with respect to the different combination. On the other hand, when the processing with respect to all combinations of the ith keypoint KPi and the jth keypoint KPj is finished, the process goes to step S249 and the keypoint estimation unit 622 executes processing of settling the grouping of the keypoints KP.

Figure 22:
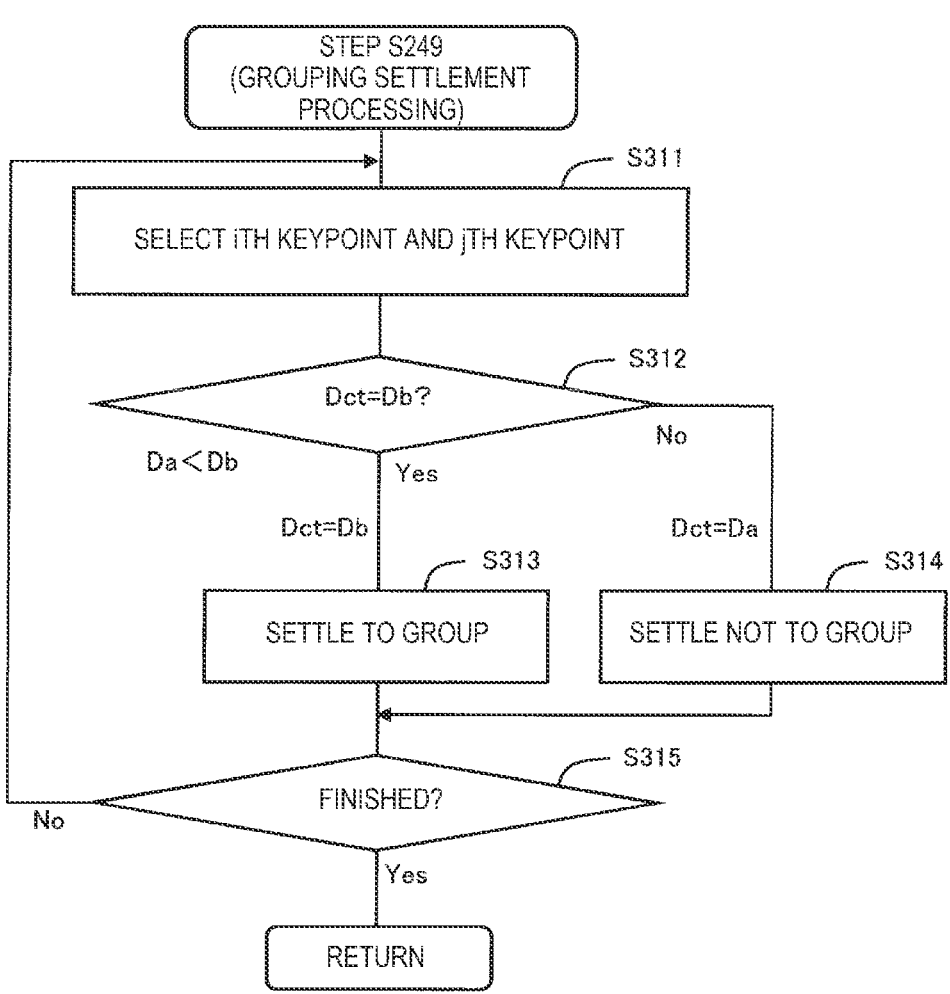
FIG. 22 is a flowchart showing an example of grouping settlement processing.

FIG. 22 is a flowchart showing an example of grouping settlement processing at step S249. At step S311, the keypoint estimation unit 622 selects one keypoint KPi from the M ith keypoints KPi as a processing object and selects one keypoint KPj from the M jth keypoints KPj as a processing object. Here, i, j are integers from 1 to N different from each other.

At step S312, the keypoint estimation unit 622 determines whether the integrated degree of conformance Dct of the two keypoints KPi, KPj is the second value db. As described in FIGS. 16 and 20, in the embodiment, the integrated degree of conformance Dct is set to one of the first value Da and the second value db and Da<db. When the integrated degree of conformance Dct is the second value db, the process goes to step S313 and the keypoint estimation unit 622 settles to group the two keypoints KPi, KPj. That is, it is settled that the two keypoints KPi, KPj belongs to the same object OB. On the other hand, when the integrated degree of conformance Dct is the first value Da, the process goes to step S314 and the keypoint estimation unit 622 settles not to group the two keypoints KPi, KPj. That is, it is settled that the two keypoints KPi, KPj do not belong to the same object OB. At step S315, whether processing with respect to all combinations of the ith keypoint KPi and the jth keypoint KPj is finished is determined. When the processing is not finished, the process returns to step S311 and the processing at steps S311 to S314 is repeated with respect to the different combination.

In the above described grouping settlement processing in FIG. 22, whether to group the two keypoints KPi, KPj is settled according to the value of the integrated degree of conformance Dct of the two keypoints KPi, KPj. Note that, in the grouping settlement processing, the adjustment of the integrated degree of conformance Dct at step S247 in FIG. 16 and steps S65, S66 in FIG. 20 can be omitted. For example, at step S245 in FIG. 16, when the integrated degree of conformance Dct is lower than the threshold Th, it may be settled not to group the two keypoints KPi, KPj without the adjustment of the integrated degree of conformance Dct. Further, at step S64 in FIG. 20, whether to group the two keypoints KPi, KPj may be settled according to whether the jth keypoint KPj belongs to the same object OB as the reference pixel p.

Figure 23:
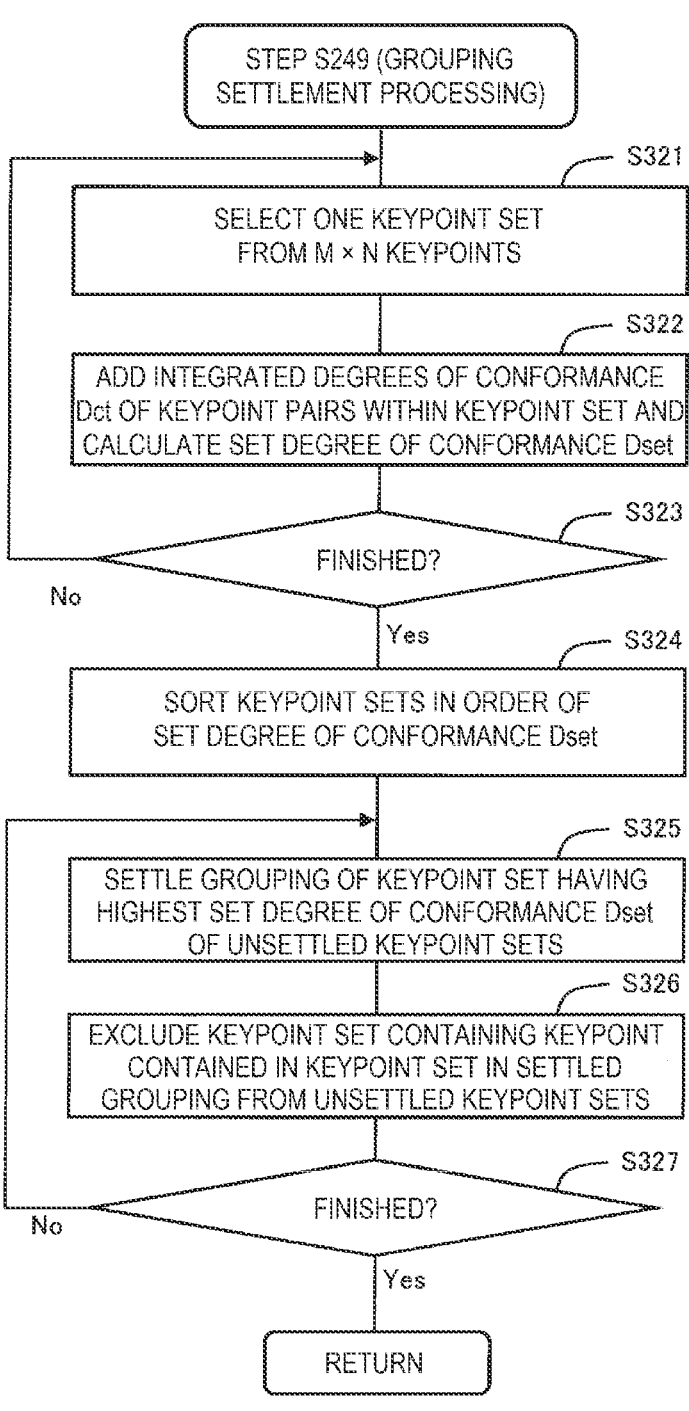
FIG. 23 is a flowchart showing another example of the grouping settlement processing.

FIG. 23 is a flowchart showing another example of the grouping settlement processing at step S249. In the grouping settlement processing, grouping is settled with respect to each keypoint set including N keypoints KP.

At step S321, the keypoint estimation unit 622 selects arbitrary one keypoint set including N keypoints KP from the first keypoint KP1 to the N keypoint KPN from the M×N keypoints KP. When n is an integer from 1 to N, each of the M×N keypoints KP contains M nth keypoints KPn and MN keypoint sets may be formed. At step S321, one of these MN keypoint sets is selected.

At step S322, the keypoint estimation unit 622 adds the integrated degrees of conformance Dct of a plurality of keypoint pairs within the keypoint set selected at step S321 and calculates a set degree of conformance Dset. "Keypoint pair" refers to a pair of keypoints KP. One keypoint set includes the N keypoints KP and contains N(N−1)/2 keypoint pairs. The set degree of conformance Dset is obtained by addition of the integrated degrees of conformance Dct of these N(N−1)/2 keypoint pairs.

At step S323, whether the processing at steps S321, S322 is finished with respect to all keypoint sets is determined, and steps S321, S322 are repeatedly executed until the processing is finished with respect to all keypoint sets. Through the processing at steps S321 to S323, the set degree of conformance Dset is calculated with respect to each of the MN keypoint sets.

At step S324, the keypoint estimation unit 622 sorts all keypoint sets in the order of the set degrees of conformance Dset. At step S325, the keypoint estimation unit 622 settles grouping of the keypoint sets having the highest set degree of conformance Dset of the unsettled keypoint sets for which grouping is not settled. "Unsettled keypoint set" refers to a keypoint set not settled to form a group belonging to the same object. When step S324 is first executed, MN unsettled keypoint sets exist.

At step S325, the keypoint estimation unit 622 settles grouping of the keypoint sets having the highest set degree of conformance Dset of the unsettled keypoint sets. That is, it is settled that the keypoint sets having the highest set degree of conformance Dset belong to the same object OB. At step S326, the keypoint estimation unit 622 excludes the plurality of keypoint sets containing the arbitrary keypoint KP contained in the keypoint sets for which grouping is settled from the unsettled keypoint sets.

Note that it is possible that the keypoint KP is not detected due to occlusion or the like, and the keypoint KP having the integrated degree of conformance Dct lower than the threshold Th at step S245 in FIG. 16 may be regarded as "deficit". Some work may be accomplished as long as particular keypoints KP as part of the N keypoints KP set for the object OB can be detected. For example, when work to grip the handle Hd of the cup shown in FIG. 3 and place the cup on a table is assumed, the work may be executed as long as the keypoint KP1 set for the bottom surface Bt of the cup and the keypoint KP2 set for the handle Hd can be detected, and the work may be accomplished without a problem even when the keypoint KP3 set for the opening portion in the top surface Tp is deficient.

At step S327, whether the processing at steps S325, S326 is finished with respect to all unsettled keypoint sets is determined and, when the processing is not finished, the process returns to step S325 and steps S325, S326 are executed again.

In the above described grouping settlement processing in FIG. 23, the grouping with respect to the keypoint sets is settled in descending order of the set degree of conformance Dset. Therefore, accurate grouping may be performed with respect to each keypoint set using the set degree of conformance Dset.

Note that, in the grouping processing described in FIG. 16, the integrated degree of conformance Dct of the two keypoints KPi, KPj is obtained by the processing at steps S242 to S244 and, when the integrated degree of conformance Dct is equal to or higher than the threshold Th at step S245, whether the keypoints KPi, KPj belong to the same object OB is estimated by the processing at step S246. The determination at step S245 may be made using the first degree of conformance Dc1 in place of the integrated degree of conformance Dct. Note that there is an advantage that the integrated degree of conformance Dct is used, and thereby, whether the two keypoints KPi, KPj belong to the same object OB may be estimated more accurately.

Or, the processing at steps S246, S247, S249 may be omitted and whether to group the two keypoints KPi, KPj may be settled only by a comparison result between the integrated degree of conformance Dct and the threshold Th. Further, whether to group the two keypoints KPi, KPj may be settled only by a comparison result between the first degree of conformance Dc1 and the threshold Th using the first degree of conformance Dc1 in place of the integrated degree of conformance Dct. In these cases, a plurality of jth keypoints KPj having the integrated degrees of conformance Dct or the first degrees of conformance Dc1 equal to or higher than the threshold Th may exist. In this case, for example, one keypoint KPj having the highest integrated degree of conformance Dct or the first degree of conformance Dc1 may be selected and grouped with the ith keypoint KPi.

Or, the processing at steps S242 to S245 may be omitted and whether to group the two keypoints KPi, KPj may be settled by the processing at step S246. That is, whether to group the keypoints may be determined by determination as to whether the two keypoints KPi, KPj belong to the same object using the field map. In this case, the calculation processing of the degree of conformance can be omitted.

Note that, as a result of the grouping processing, the keypoint KP that does not belong to any object OB may be left. In this case, the keypoint KP may be discarded. In the viewpoint, when M objects OB for which positions and attitudes can be recognized exist in the input image IM, more than M×N keypoints KP may be estimated by the processing at step S230 in FIG. 14. In the present disclosure, the phrase "M×N keypoints KP are estimated" is used in a broader sense including a case where more than M×N keypoints KP are estimated.

At step S250 in FIG. 14, the position and attitude determination unit 624 determines the position and the attitude of the object OB from the N keypoints KP grouped with respect to each object OB. As described in FIG. 3, the N keypoints KP indicate three-dimensional coordinates (x,y,z) of N representative positions representing N particular portions of the object OB and, if the N keypoints KP relating to the same object OB are known, the position and the attitude of the object OB can be determined from these keypoints KP. At step S250, the position and the attitude of at least one object OB are determined.

At step S260, the robot system executes picking work of the object OB using the position and the attitude of the object OB. The details of the picking work is described in the robot control program RP. The processing at steps S210 to S260 is repeatedly executed as necessary.

According to the position and attitude recognition process of the above described embodiment, three-dimensional coordinates of the N keypoints KP belonging each of the M objects OB may be obtained using the feature maps obtained using the machine learning model 630. Further, the position and the attitude of at least one object OB may be determined.

Other Embodiments

The present disclosure is not limited to the above described embodiments, but may be realized in various forms without departing from the scope thereof. For example, the present disclosure can be realized in the following aspects. The technical features in the above described embodiments corresponding to the technical features in the respective aspects described as below can be appropriately replaced or combined for solving part or all of the problems of the present disclosure or achieving part or all of the effects of the present disclosure. Further, the technical features not described as essential features in the specification can be appropriately removed.

(1) According to a first aspect of the present disclosure, a method of learning a machine learning model used for recognition of a position and an attitude of an object imaged by a camera using a plurality of keypoints set for the object is provided. The method includes (a) generating a plurality of learning object models in which at least part of a shape and a surface property of the object is changed using basic shape data of the object, (b) generating a plurality of scenes in which part or all of the plurality of learning object models are placed in an environment in which the object is to be placed by simulations and generating a plurality of simulation images which are to be obtained by imaging of the respective plurality of scenes by the camera, (c) generating a correct feature map showing correct values of feature amounts relating to the plurality of keypoints to correspond to each of the plurality of simulation images, and (d) learning the machine learning model for estimation of a feature map from an input image captured by the camera using the plurality of simulation images and a plurality of the correct feature maps as teacher data.

According to the method, the plurality of learning object models with changes of at least part of the shape and the surface property of the object are generated and the plurality of simulation images relating to the plurality of scenes in which the models are placed are generated, and the correct feature map corresponding thereto is generated. Therefore, even when the shape and the surface property of the object change, the machine learning model that may accurately estimate the feature map may be appropriately learned.

(2) In the method, at least one of the plurality of learning object models may have a shape obtained by changing of a basic shape represented by the basic shape data using a shape change method not changing a size at a same magnification.

According to the method, teacher data suitable for the machine learning model used for recognition of the positions and attitudes of the objects having various shapes may be created.

(3) According to a second aspect of the present disclosure, a non-transitory computer-readable storage medium storing a computer program for controlling a processor to execute processing of learning a machine learning model used for recognition of a position and an attitude of an object imaged by a camera using a plurality of keypoints set for the object is provided. The computer program is for controlling the processor to execute (a) processing of generating a plurality of learning object models in which at least part of a shape and a surface property of the object is changed using basic shape data of the object, (b) processing of generating a plurality of scenes in which part or all of the plurality of learning object models are placed in an environment in which the object is to be placed by simulations and generating a plurality of simulation images which are to be obtained by imaging of the respective plurality of scenes by the camera, (c) processing of generating a correct feature map showing correct values of feature amounts relating to the plurality of keypoints to correspond to each of the plurality of simulation images, and (d) processing of learning the machine learning model for estimation of a feature map from an input image captured by the camera using the plurality of simulation images and a plurality of the correct feature maps as teacher data.

(4) According to a third aspect of the present disclosure, a method of recognizing a position and an attitude of an object using first to Nth N keypoints set for the object, M being an integer of 1 or more and N being an integer of 2 or more is provided. The method includes (a) generating an input image by imaging a scene containing the M objects by a camera, (b) obtaining a feature map showing feature amounts relating to the N keypoints from the input image using a learned machine learning model with the input image as input and the feature map as output, (c) obtaining three-dimensional coordinates of the N keypoints belonging to each of the M objects using the feature map, and (d) determining positions and attitudes of one or more objects of the M objects using the three-dimensional coordinates of the N keypoints belonging to each of the M objects. (c) includes (c1) obtaining M×N keypoints having undetermined correspondence relationships with the M objects and determining the three-dimensional coordinates of the M×N keypoints, and (c2) grouping the M×N keypoints to the N keypoints belonging to each of the M objects.

According to the method, the three-dimensional coordinates of the N keypoints belonging each of the M objects may be obtained using the feature maps obtained using the machine learning model. Further, the position and the attitude of at least one object may be determined.

(5) In the method, the feature map used at (c2) may contain N directional vector maps as maps in which vectors indicating directions from a plurality of pixels belonging to a same object to an object keypoint are assigned to the plurality of pixels with each of the N keypoints as the object keypoint. (c2) may include (c2-1) selecting one ith keypoint from M ith keypoints and selecting one jth keypoint from M jth keypoints, (c2-2) calculating a first degree of conformance indicating a degree of coincidence of directions of a first vector obtained from a jth directional vector map and indicating a direction from a pixel position of the ith keypoint toward the jth keypoint and a second vector indicating a direction from a pixel position expressed by the three-dimensional coordinates of the ith keypoint to a pixel position expressed by the three-dimensional coordinates of the jth keypoint, and (c2-3) repeating (c2-1) and (c2-2) and performing the grouping of the M×N keypoints according to the first degree of conformance, i, j being integers from 1 to N different from each other.

According to the method, grouping of the keypoints may be performed using the directional vector map.

(6) In the method, (c2-2) may include (2a) calculating a second degree of conformance indicating a degree of coincidence of directions of a third vector obtained from an ith directional vector map and indicating a direction from a pixel position of the jth keypoint toward the ith keypoint and a fourth vector indicating a direction from a pixel position expressed by the three-dimensional coordinates of the jth keypoint to a pixel position expressed by the three-dimensional coordinates of the ith keypoint, and (2b) calculating an integrated degree of conformance by integration of the first degree of conformance and the second degree of conformance, and (c2-3) may execute the grouping according to the integrated degree of conformance.

According to the method, the grouping of the keypoints can be performed more accurately using the integrated degree of conformance.

(7) In the method, the feature map used at (c2) may further contain a field map showing whether pixels belong to a same object. (c2-3) may include (3a) estimating that the ith keypoint and the jth keypoint do not belong to a same object when the integrated degree of conformance is lower than a threshold, and (3b) estimating whether the ith keypoint and the jth keypoint belong to a same object using the field map when the integrated degree of conformance is equal to or higher than the threshold.

According to the method, when the directions of the two keypoints are sufficiently close and the integrated degree of conformance is high, whether the two keypoints belong to a same object may be estimated using the field map.

(8) In the method, (c2-3) may further include (3c) adjusting the integrated degree of conformance to a first value when estimated that the ith keypoint and the jth keypoint do not belong to a same object and adjusting the integrated degree of conformance to a second value higher than the first value when estimated that the ith keypoint and the jth keypoint belong to a same object, (3d) selecting arbitrary one keypoint set including N keypoints from the first keypoint to the Nth keypoint from the M×N keypoints, (3e) calculating a set degree of conformance for the keypoint set by adding the integrated degrees of conformance for N(N−1)/2 keypoint pairs respectively formed by arbitrary two keypoints contained in the keypoint set, (3f) repeating (3d), (3e) and obtaining the set degrees of conformance for the plurality of keypoint sets, and (3g) settling the grouping relating to the keypoint set in descending order of the set degree of conformance.

According to the method, accurate grouping may be performed with respect to each keypoint set using the set degree of conformance.

(9) In the method, the feature map used at (c2) may further contain a field map showing whether pixels belong to a same object. (c2) may include (c2-1) selecting one ith keypoint from M ith keypoints and selecting one jth keypoint from M jth keypoints, and (c2-2) determining whether the ith keypoint and the jth keypoint belong to a same object using the field map, i, j being integers from 1 to N different from each other.

According to the method, whether the two keypoints belong to a same object may be determined using the field map.

(10) In the method, the feature map used at (c1) may contain N heat maps as maps each showing a probability that an object keypoint exists with each of the N keypoints as the object keypoint, and a distance map showing distances from the camera to a plurality of pixels belonging to each of the M objects. (c1) may include (c1-1) obtaining M two-dimensional coordinates of an nth keypoint using an nth heat map, n being an integer from 1 to N, (c1-2) determining three-dimensional coordinates of the M nth keypoints from the distance map and the two-dimensional coordinates of the M nth keypoints, and (c1-3) repeating (c1-1), (c1-2) and determining the three-dimensional coordinates of the M×N keypoints.

According to the method, the three-dimensional coordinates of the M×N keypoints may be obtained using the feature map obtained using the machine learning model.

(11) According to a fourth aspect of the present disclosure, a non-transitory computer-readable storage medium storing a computer program for controlling a processor to execute processing of recognizing a position and an attitude of an object using first to Nth N keypoints set for the object, M being an integer of 1 or more and N being an integer of 2 or more, is provided. The computer program is for controlling the processor to execute (a) processing of generating an input image by imaging a scene containing the M objects by a camera, (b) processing of obtaining a feature map showing feature amounts relating to the N keypoints from the input image using a learned machine learning model with the input image as input and the feature map as output, (c) processing of obtaining three-dimensional coordinates of the N keypoints belonging to each of the M objects using the feature map, and (d) processing of determining positions and attitudes of one or more objects of the M objects using the three-dimensional coordinates of the N keypoints belonging to each of the M objects. (c) includes (c1) processing of obtaining M×N keypoints having undetermined correspondence relationships with the M objects and determining the three-dimensional coordinates of the M×N keypoints, and (c2) processing of grouping the M×N keypoints to the N keypoints belonging to each of the M objects.

The present disclosure can be realized in various other aspects than those described above. For example, the present disclosure may be realized in a robot system including a robot and a robot control apparatus, a computer program for realizing functions of the robot control apparatus, and a non-transitory storage medium storing the computer program.

What is claimed is:

1. A method of recognizing a position and an attitude of an object using first to Nth N keypoints set for the object, M being an integer of 1 or more and N being an integer of 2 or more, comprising:

(a) generating an input image by imaging a scene containing the M objects by a camera;

(b) obtaining a feature map showing feature amounts relating to the N keypoints from the input image using a learned machine learning model with the input image as input and the feature map as output;

(c) obtaining three-dimensional coordinates of the N keypoints belonging to each of the M objects using the feature map; and (d) determining positions and attitudes of one or more objects of the M objects using the three-dimensional coordinates of the N keypoints belonging to each of the M objects, wherein (c) includes:

(c1) obtaining M×N keypoints having undetermined correspondence relationships with the M objects and determining the three-dimensional coordinates of the M×N keypoints; and (c2) grouping the M×N keypoints to the N keypoints belonging to each of the M objects, the feature map used at (c2) contains N directional vector maps as maps in which vectors indicating directions from a plurality of pixels belonging to a same object to an object keypoint are assigned to the plurality of pixels with each of the N keypoints as the object keypoint, and (c2) includes:

(c2-1) selecting one ith keypoint from M ith keypoints and selecting one jth keypoint from M jth keypoints;

(c2-2) calculating a first degree of conformance indicating a degree of coincidence of directions of a first vector obtained from a jth directional vector map and indicating a direction from a pixel position of the ith keypoint toward the jth keypoint and a second vector indicating a direction from a pixel position expressed by the three-dimensional coordinates of the ith keypoint to a pixel position expressed by the three-dimensional coordinates of the jth keypoint, i and j being integers from 1 to N different from each other; and (c2-3) repeating (c2-1) and (c2-2) and performing the grouping of the M×N keypoints according to the first degree of conformance, wherein (c2-2) further includes:

(2a) calculating a second degree of conformance indicating a degree of coincidence of directions of a third vector obtained from an ith directional vector map and indicating a direction from a pixel position of the jth keypoint toward the ith keypoint and a fourth vector indicating a direction from a pixel position expressed by the three-dimensional coordinates of the jth keypoint to a pixel position expressed by the three-dimensional coordinates of the ith keypoint; and (2b) calculating an integrated degree of conformance by integration of the first degree of conformance and the second degree of conformance, and (c2-3) further executes the grouping according to the integrated degree of conformance, wherein the feature map used at (c2) further contains a field map showing whether pixels belong to a same object, and (c2-3) further includes:

(3a) estimating that the ith keypoint and the jth keypoint do not belong to a same object when the integrated degree of conformance is lower than a threshold;

(3b) estimating whether the ith keypoint and the jth keypoint belong to a same object using the field map when the integrated degree of conformance is equal to or higher than the threshold;

(3c) adjusting the integrated degree of conformance to a first value when estimated that the ith keypoint and the jth keypoint do not belong to a same object and adjusting the integrated degree of conformance to a second value higher than the first value when estimated that the ith keypoint and the jth keypoint belong to a same object;

(3d) selecting one arbitrary keypoint set including N keypoints from the first keypoint to the Nth keypoint from the M×N keypoints;

(3e) calculating a set degree of conformance for the keypoint set by adding the integrated degrees of conformance for N (N−1)/2 keypoint pairs respectively formed by two arbitrary keypoints contained in the keypoint set;

(3f) repeating (3d), (3e) and obtaining the set degrees of conformance for a plurality of the keypoint sets; and (3g) settling the grouping relating to the keypoint set in descending order of the set degree of conformance.

2. A non-transitory computer-readable storage medium storing a computer program for controlling a processor to execute processing of recognizing a position and an attitude of an object using first to Nth N keypoints set for the object, M being an integer of 1 or more and N being an integer of 2 or more, the computer program for controlling the processor to execute:

(a) processing of generating an input image by imaging a scene containing M objects by a camera;

(b) processing of obtaining a feature map showing feature amounts relating to the N keypoints from the input image using a learned machine learning model with the input image as input and the feature map as output;

(c) processing of obtaining three-dimensional coordinates of the N keypoints belonging to each of the M objects using the feature map; and (d) processing of determining positions and attitudes of one or more objects of the M objects using the three-dimensional coordinates of the N keypoints belonging to each of the M objects, wherein (c) includes:

(c1) processing of obtaining M×N keypoints having undetermined correspondence relationships with the M objects and determining the three-dimensional coordinates of the M×N keypoints; and (c2) processing of grouping the M×N keypoints to the N keypoints belonging to each of the M objects, the feature map used at (c2) contains N directional vector maps as maps in which vectors indicating directions from a plurality of pixels belonging to a same object to an object keypoint are assigned to the plurality of pixels with each of the N keypoints as the object keypoint, and (c2) includes:

(c2-1) processing of selecting one ith keypoint from M ith keypoints and selecting one jth keypoint from M jth keypoints;

(c2-2) processing of calculating a first degree of conformance indicating a degree of coincidence of directions of a first vector obtained from a jth directional vector map and indicating a direction from a pixel position of the ith keypoint toward the jth keypoint and a second vector indicating a direction from a pixel position expressed by the three-dimensional coordinates of the ith keypoint to a pixel position expressed by the three-dimensional coordinates of the jth keypoint, i and j being integers from 1 to N different from each other; and (c2-3) processing of repeating (c2-1) and (c2-2) and performing the grouping of the M×N keypoints according to the first degree of conformance, wherein (c2-2) further includes:

(2a) calculating a second degree of conformance indicating a degree of coincidence of directions of a third vector obtained from an ith directional vector map and indicating a direction from a pixel position of the jth keypoint toward the ith keypoint and a fourth vector indicating a direction from a pixel position expressed by the three-dimensional coordinates of the jth keypoint to a pixel position expressed by the three-dimensional coordinates of the ith keypoint; and (2b) calculating an integrated degree of conformance by integration of the first degree of conformance and the second degree of conformance, and (c2-3) further executes the grouping according to the integrated degree of conformance, wherein the feature map used at (c2) further contains a field map showing whether pixels belong to a same object, and (c2-3) further includes:

(3a) estimating that the ith keypoint and the jth keypoint do not belong to a same object when the integrated degree of conformance is lower than a threshold;

(3b) estimating whether the ith keypoint and the jth keypoint belong to a same object using the field map when the integrated degree of conformance is equal to or higher than the threshold;

(3c) adjusting the integrated degree of conformance to a first value when estimated that the ith keypoint and the jth keypoint do not belong to a same object and adjusting the integrated degree of conformance to a second value higher than the first value when estimated that the ith keypoint and the jth keypoint belong to a same object;

(3d) selecting one arbitrary keypoint set including N keypoints from the first keypoint to the Nth keypoint from the M×N keypoints;

(3e) calculating a set degree of conformance for the keypoint set by adding the integrated degrees of conformance for N (N−1)/2 keypoint pairs respectively formed by two arbitrary keypoints contained in the keypoint set;

(3f) repeating (3d), (3e) and obtaining the set degrees of conformance for a plurality of the keypoint sets; and (3g) settling the grouping relating to the keypoint set in descending order of the set degree of conformance.

\* \* \* \* \*